United States Patent [19]
Gattuso et al.

[11] Patent Number: 6,086,041
[45] Date of Patent: Jul. 11, 2000

[54] MULTI-VALVE MODULE HAVING A CERAMIC PIEZOELECTRIC ACTUATOR

[75] Inventors: David A. Gattuso, Deerfield; Anthony R. Haba, II, Stratham; Richard D. Rhodes, Jr., Somersworth, all of N.H.

[73] Assignee: McCord Winn Textron Inc., Manchester, N.H.

[21] Appl. No.: 09/143,784

[22] Filed: Aug. 31, 1998

Related U.S. Application Data

[63] Continuation-in-part of application No. PCT/US98/06792, Apr. 6, 1998.
[60] Provisional application No. 60/042,731, Apr. 7, 1997.

[51] Int. Cl.[7] .................................................. F16K 31/02
[52] U.S. Cl. ...................... 251/129.06; 251/367; 137/884
[58] Field of Search ................... 251/129.06, 367; 137/596.17, 877, 883, 884; 297/DIG. 3, 284.6

[56] References Cited

U.S. PATENT DOCUMENTS

| | | | |
|---|---|---|---|
| 3,931,388 | 1/1976 | Hafner et al. | 310/9.4 |
| 4,354,133 | 10/1982 | Vig | 310/344 |
| 4,498,851 | 2/1985 | Kolm et al. | 417/322 |
| 4,513,780 | 4/1985 | Evans . | |
| 4,545,561 | 10/1985 | Brown . | |
| 4,610,426 | 9/1986 | Brandner | 251/129.06 |
| 4,617,952 | 10/1986 | Fujiwara et al. | 251/129.06 |
| 4,655,505 | 4/1987 | Kashiwamura et al. . | |
| 4,934,401 | 6/1990 | Ikehata et al. . | |
| 5,029,805 | 7/1991 | Albarada et al. . | |
| 5,079,472 | 1/1992 | Uhl et al. . | |
| 5,127,708 | 7/1992 | Kishi et al. . | |
| 5,203,537 | 4/1993 | Jacobs et al. | 251/129.06 |
| 5,238,223 | 8/1993 | Mettner et al. . | |
| 5,361,803 | 11/1994 | Stoll | 251/367 |
| 5,417,142 | 5/1995 | Lohmann | 251/129.06 |
| 5,447,286 | 9/1995 | Kamen et al. | 251/30.02 |
| 5,570,716 | 11/1996 | Kamen et al. . | |
| 5,628,411 | 5/1997 | Mills et al. | 251/129.06 |
| 5,630,440 | 5/1997 | XCKnutson et al. . | |
| 6,000,422 | 12/1999 | Shigemoto | 137/884 |

FOREIGN PATENT DOCUMENTS

| | | | |
|---|---|---|---|
| 236974 | 10/1986 | Japan | 251/129.06 |
| 261777 | 11/1987 | Japan | 251/129.06 |
| 28585 | 11/1987 | Japan | 251/129.06 |

*Primary Examiner*—Steven O. Douglas
*Assistant Examiner*—Khoa Huynh
*Attorney, Agent, or Firm*—Reising, Ethington, Barnes, Kisselle, Learman & McCulloch, PC

[57] ABSTRACT

A low energy consumption valve module (16) includes low energy consumption valves (20) having either bimorphs or monomorphs defined by a circular diaphragm (21) carrying one or more piezoelectric discs (22) (23) operative to position a sealing disc (36) for sealing a valve seat (34). In one embodiment the discs are energized across conductive seals (51,52,54,56) and in another embodiment the discs are energized by a pair of flexible conductors (150). A process for making the bimorphs or monomorphs comprises a tape cast process in which ceramic with piezoelectric properties is shaped without machining. A process for making the valve module providing a valve body (200) and valve cover (202) of either laser energy transparent or laser energy absorbent polyimide material that are joined at a line to line contact (210) and sealed upon application of a laser welding beam to the line to line contact between the valve body and the valve cover at the perimeter thereof.

26 Claims, 15 Drawing Sheets

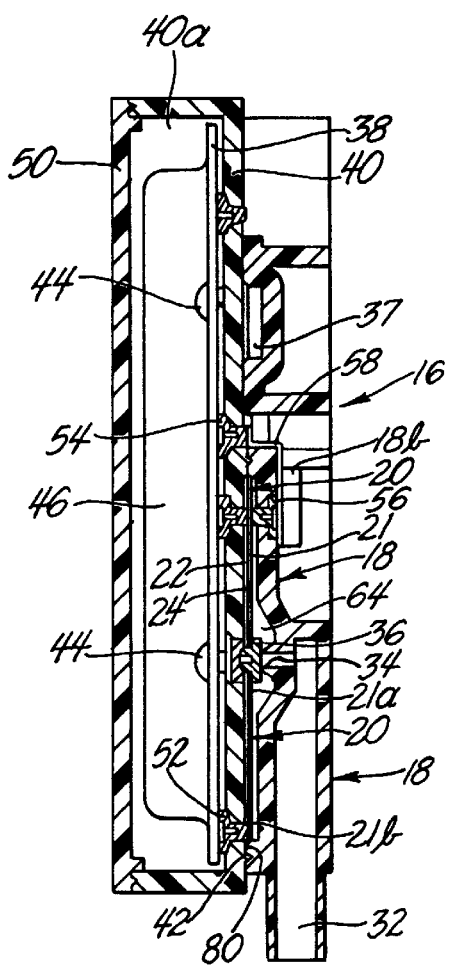
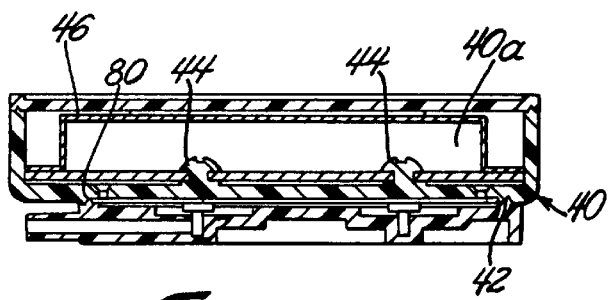
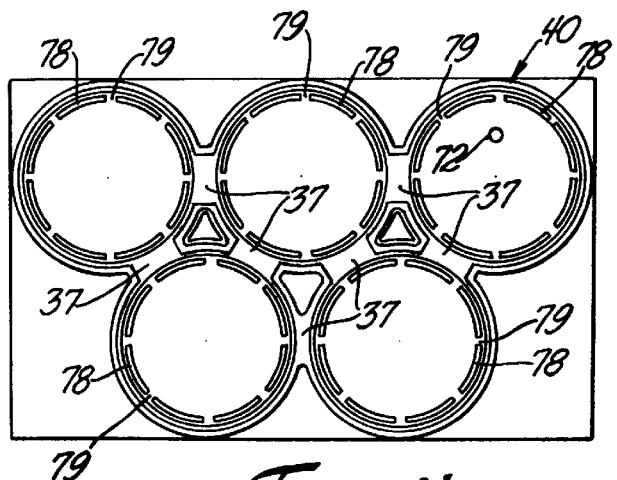
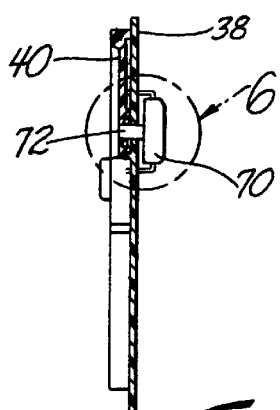
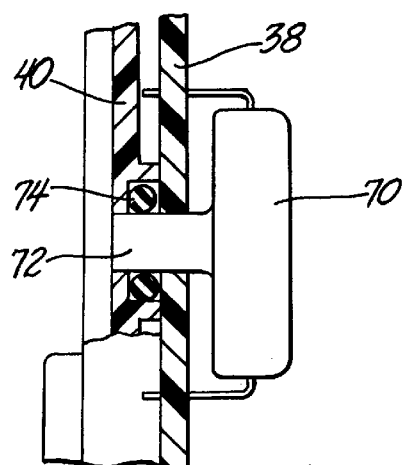

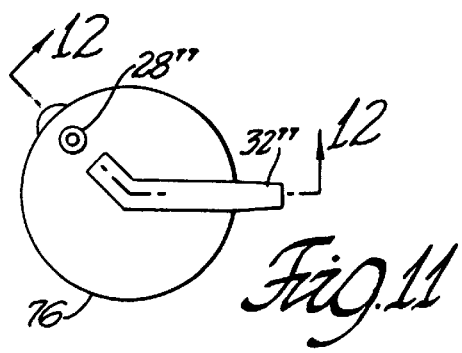
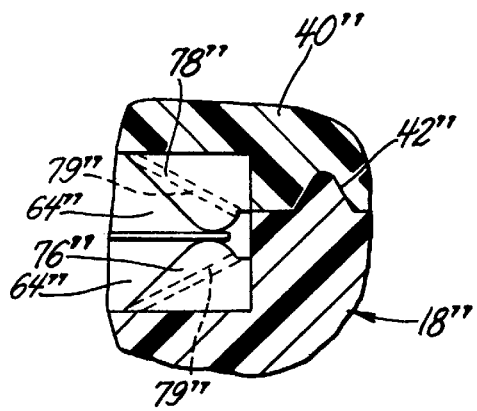
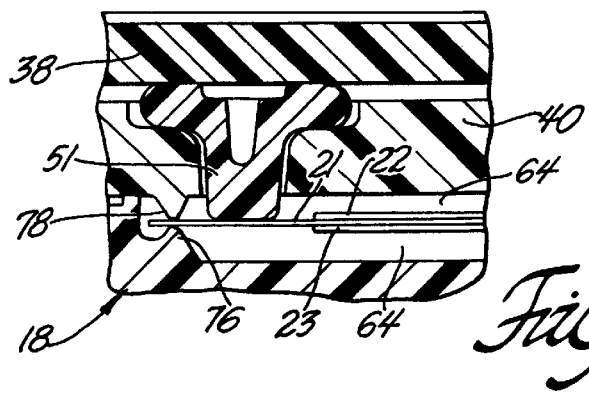
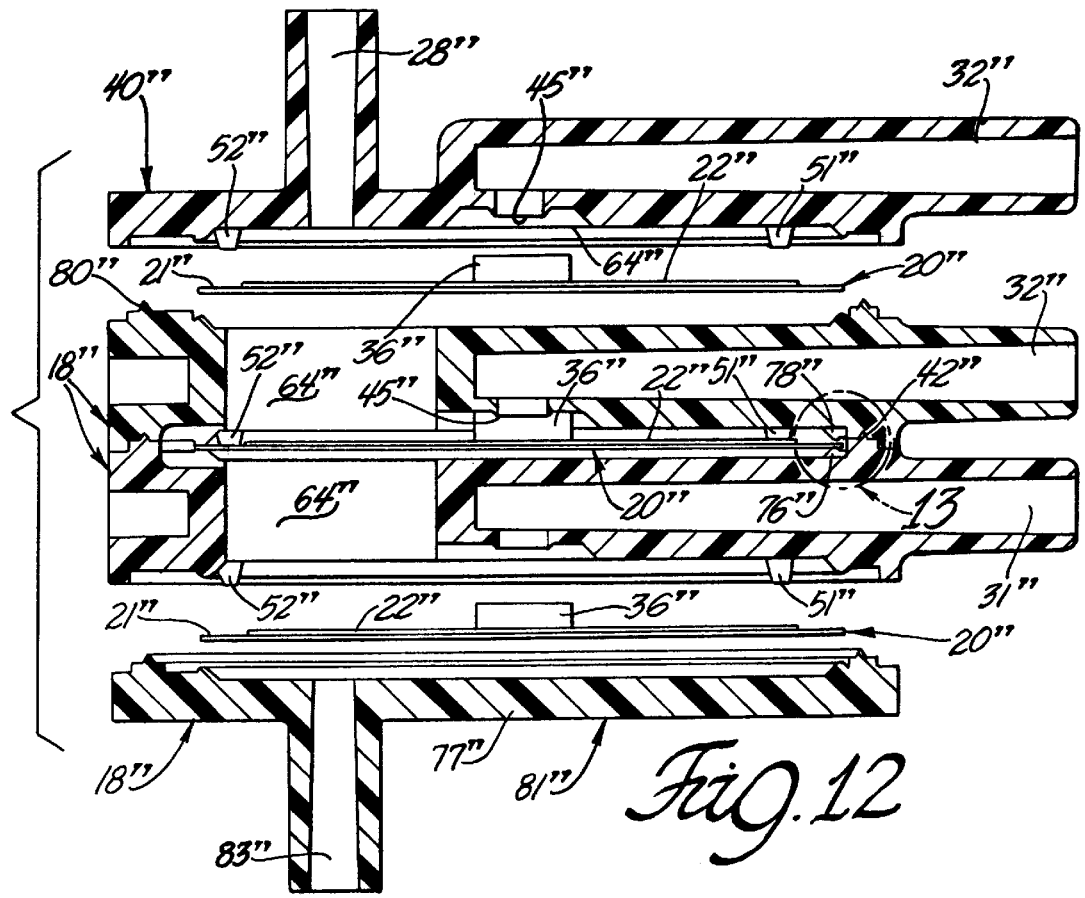

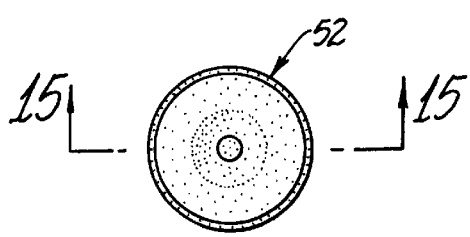
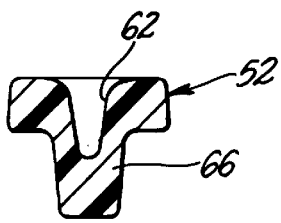
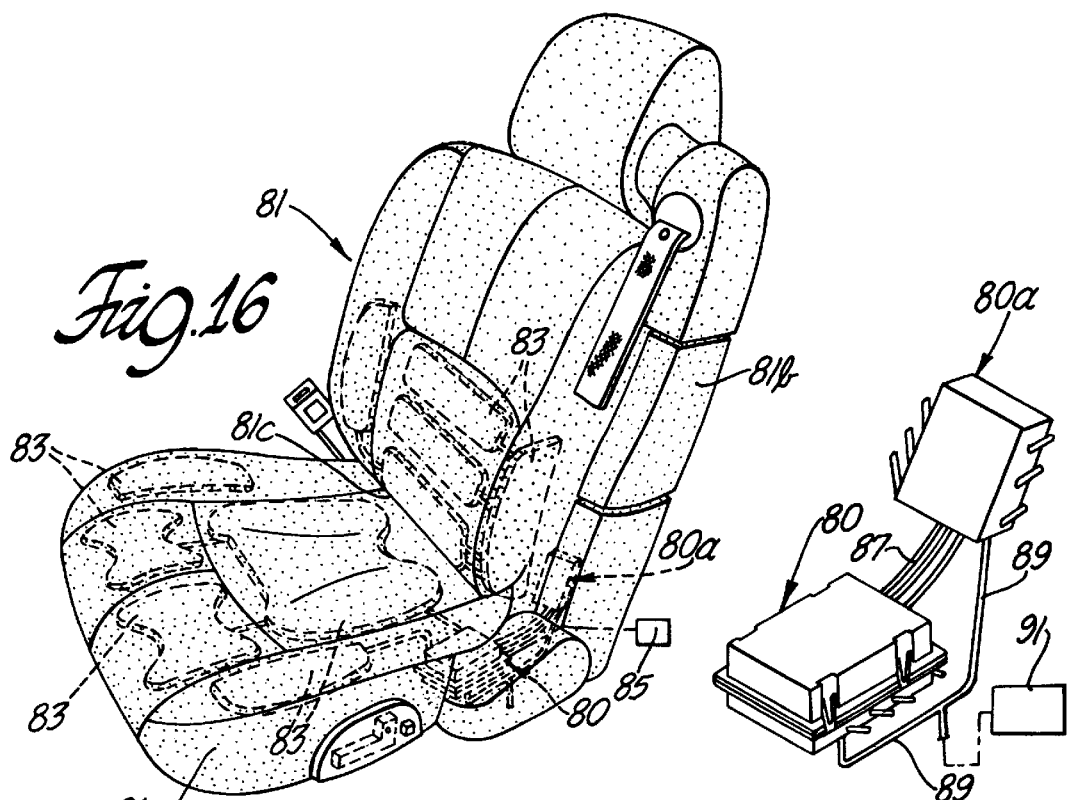
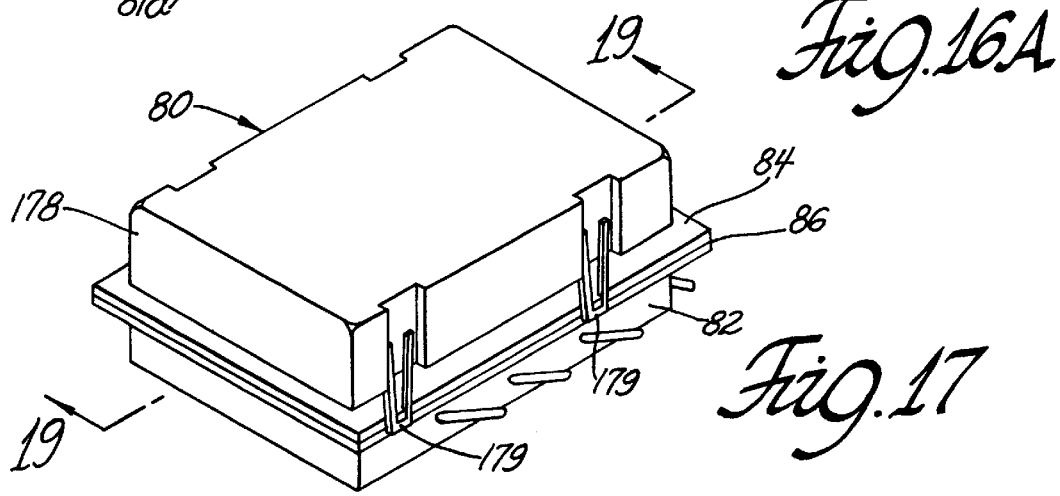

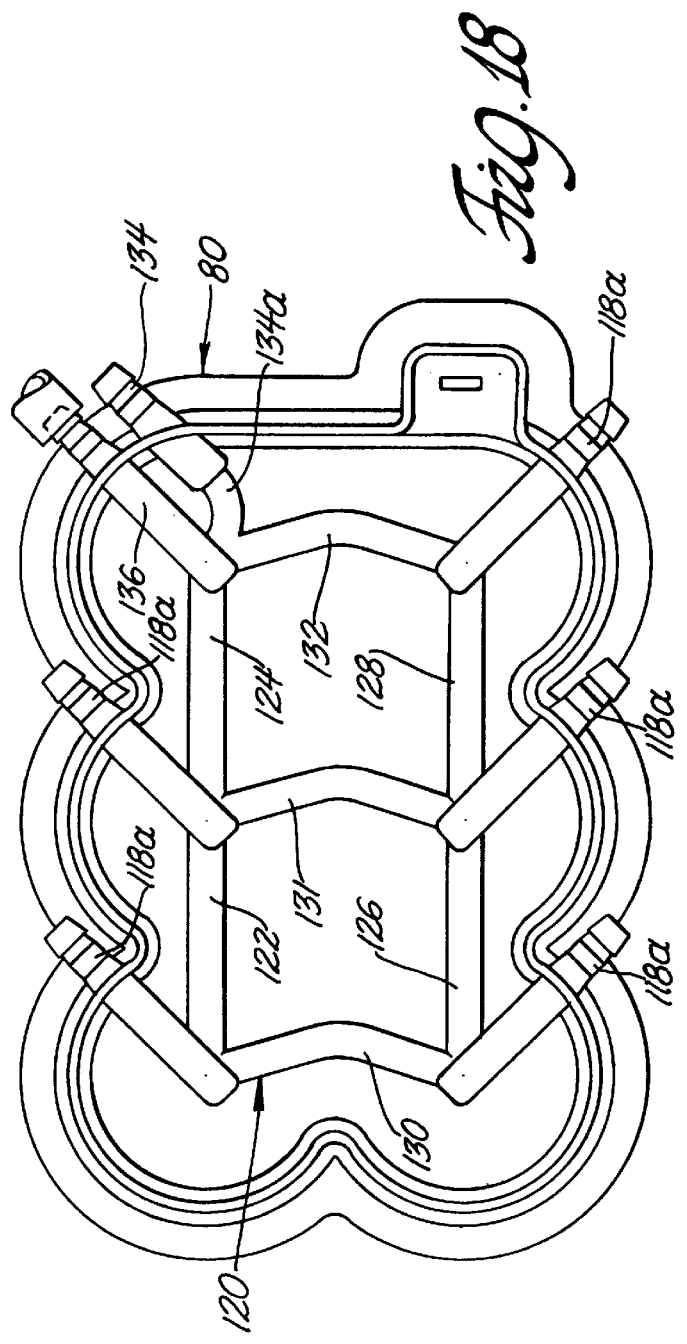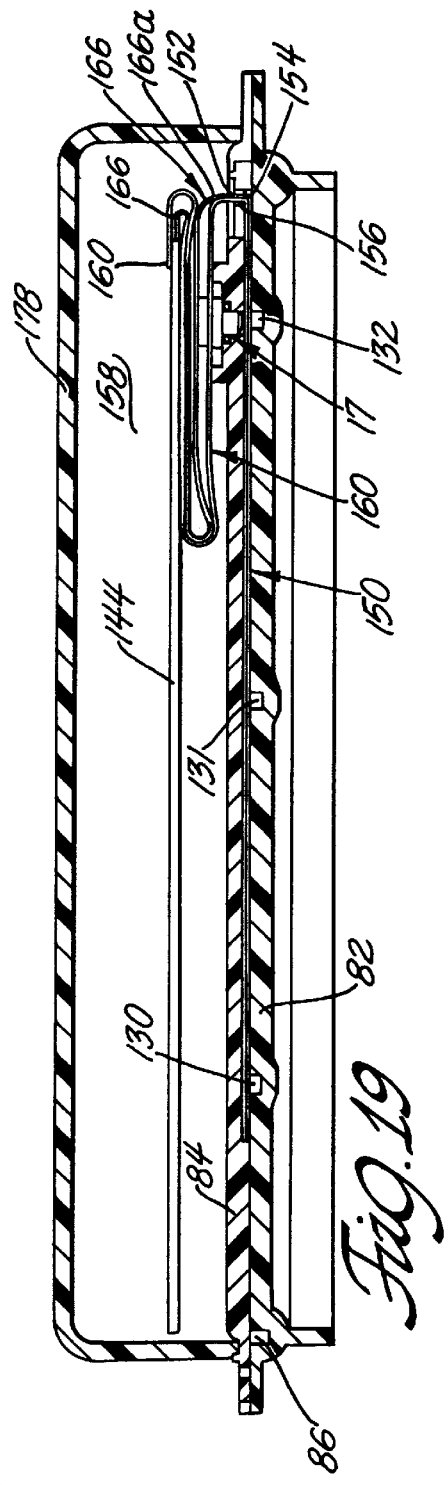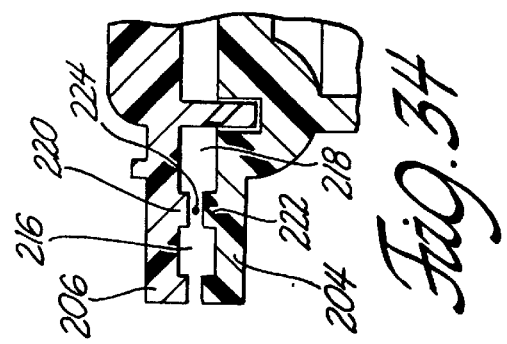

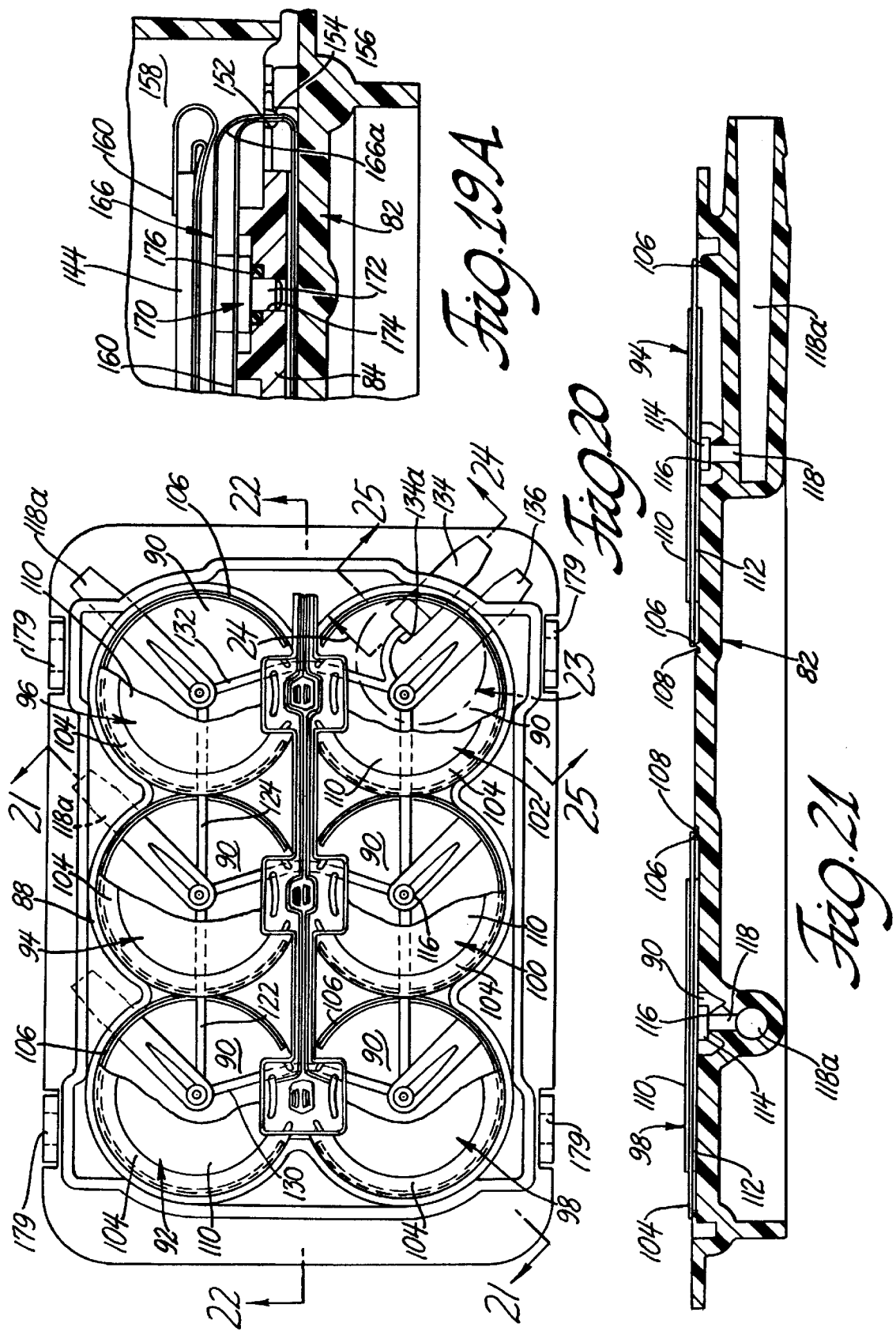

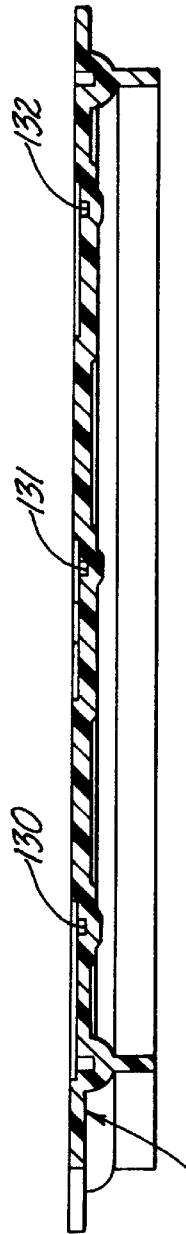
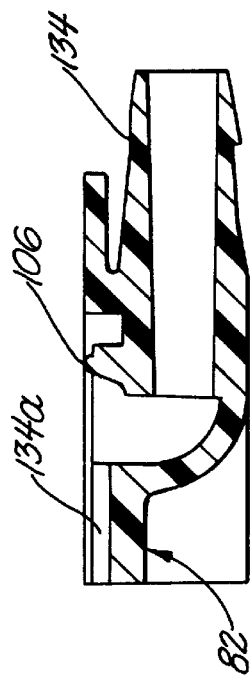
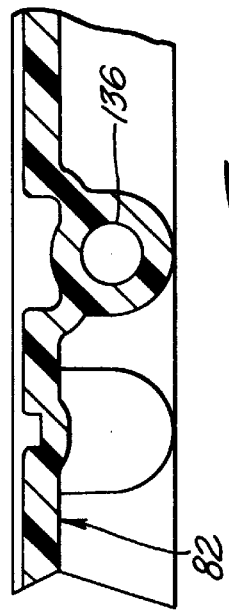
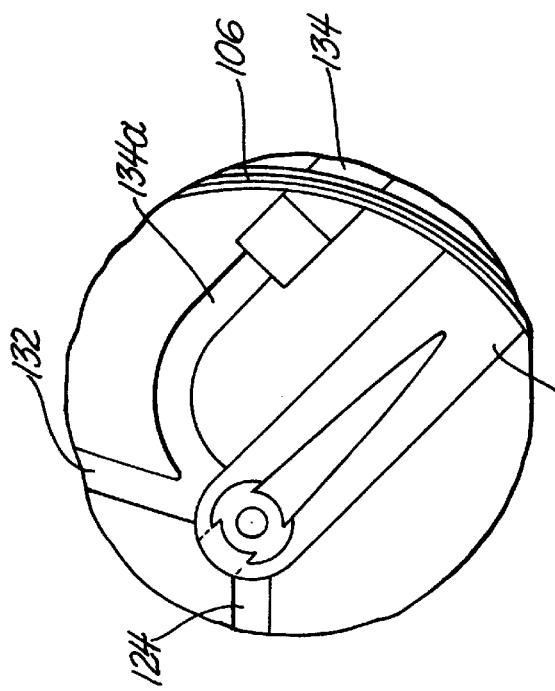

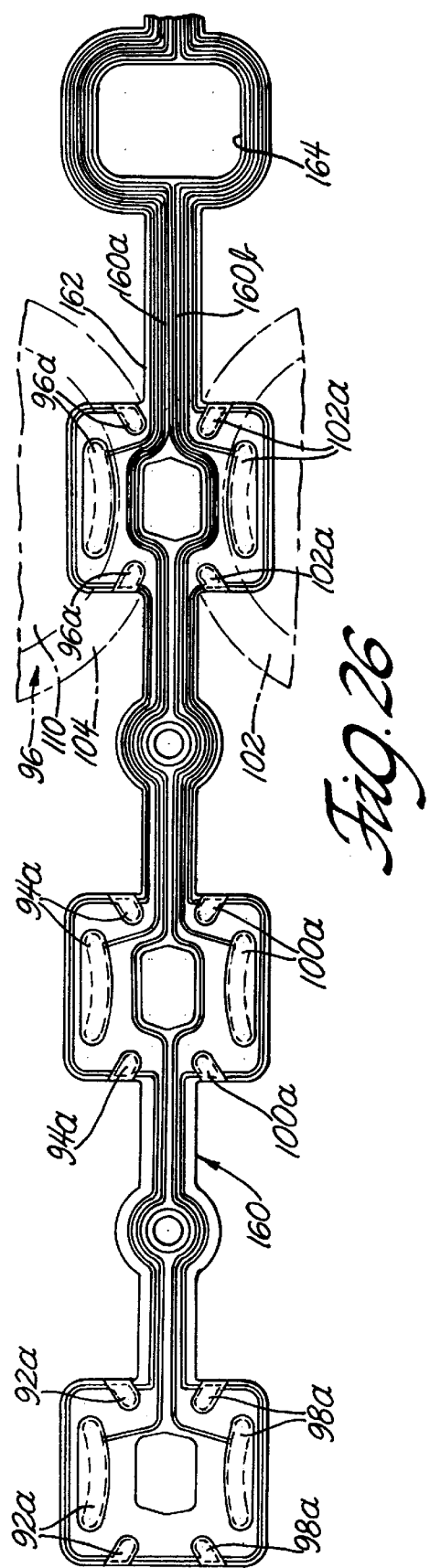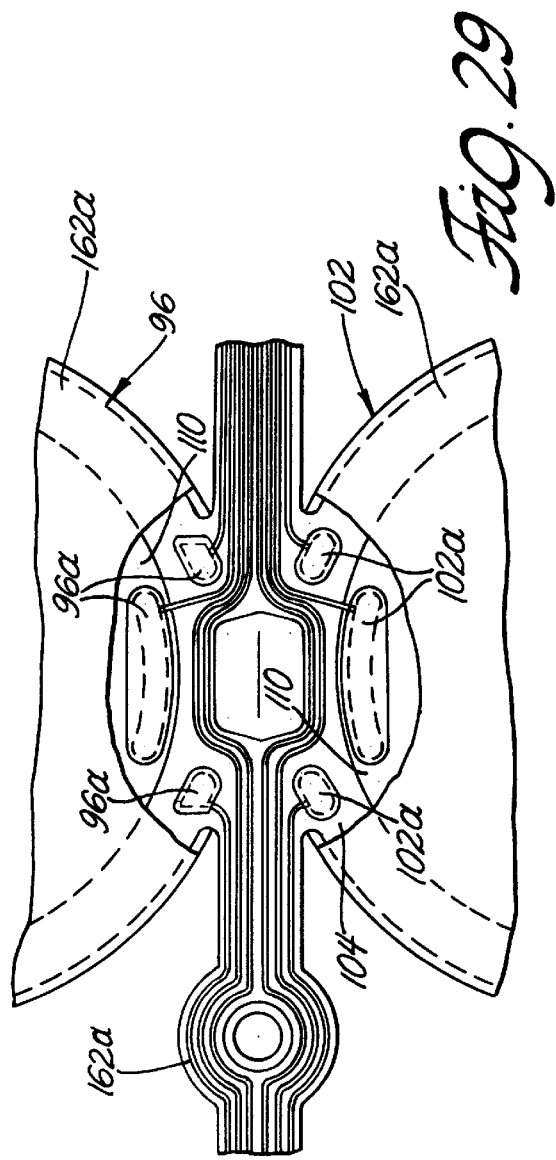

MULTI-VALVE MODULE HAVING A CERAMIC PIEZOELECTRIC ACTUATOR

This application is a continuation-in-part of PCT/US98/06792 filed Apr. 6, 1998; which is a continuation in part of U.S. provisional application Ser. No. 60/042,731 filed Apr. 7, 1997.

This invention relates to low energy consumption valves and more particularly to low energy consumption valves having a piezoelectric actuator for controlling a relatively large volume of flow through a valve unit.

BACKGROUND OF THE INVENTION

U.S. patent application Ser. No. 08/808,511, filed Feb. 27, 1997, discloses a pneumatically controlled seating system in which an electronic control module selectively controls energization of a valve unit for controlling air flow from a pressure source to a plurality of pressurizable air cells.

The valve unit is a low energy consumption valve that is opened and closed by a valve actuator having a low consumption of power during operation of the system. One suitable valve for use in such systems is shown in U.S. Pat. No. 5,447,286 wherein a high flow valve is controlled by pilot air selectively delivered by a piezo vent valve. The piezo actuation is provided by a cantilevered member that has a layer of ceramic material bonded to a carrier plate. The ceramic material deforms when a voltage is imposed thereon by the control module. Deformation of the ceramic layer will deflect the carrier plate to open and close the vent valve that in turn controls the high flow valve.

While suitable for its intended purpose, the use of a cantilevered configured piezo actuator in the valve shown in U.S. Pat. No. 5,447,286 is not adaptable to ease of assembly in a valve module that controls air flow to a number of air cells. Furthermore, it is difficult to arrange such valves in a limited space within a valve module. Furthermore, in addition to the piezo vent valve, a high flow valve is required.

SUMMARY OF THE INVENTION

The problem of providing a compactly arranged and easily assembled direct acting valve module is addressed in the present invention by use of a piezo monomorph or piezo bimorph having a circular diaphragm that is connected to a ceramic coating having piezoelectric properties that will, upon being connected to a predetermined voltage source, change in shape to shift the circular diaphragm from a flat configuration to a spherical configuration wherein a resilient seal element thereon will be positioned to open or close a valve seat for controlling high volume flow between a source of pressure and a device operated by pressure.

One feature of the present invention is to provide such a valve module configured for connection to a circuit board that electrically connects the valve module to a microprocessor control.

Another feature of the present invention is to provide such a valve module having staggered circular formed monomorphs or bimorphs for compactness.

Still another feature of the present invention is to provide such a valve module wherein circular formed monomorphs or bimorphs are arranged in-line.

Still another feature of the present invention is to provide such a valve module wherein circular formed monomorphs or bimorphs are located in stacked valve bodies.

Still another object is to provide such circular shaped piezoelectric bimorphs or monomorphs having a sealing disc arrangement thereon for selectively controlling flow through two or more fluid ports in accordance with two or more electrical signals applied to the piezoelectric material on the bimorph or monomorph.

Another object of the present invention is to provide an improved valve module having a valve body and a valve cover forming an enclosure for circular monomorphs or bimorphs operative to directly control high volume fluid flow to and from the valve body.

A further object is to provide such a valve module wherein an ultrasonic weld connects the valve body to the valve cover for sealing a fluid cavity therebetween.

A still further object is to provide such a valve module wherein a laser weld connects the valve body to the valve cover for sealing a fluid cavity therebetween.

Yet another object of the invention is to provide such a valve module including a circuit board supported on one surface of the valve cover.

Still another object of the invention is to provide such a valve module further including a fluid supply manifold integral of the valve body for directing fluid to and from a fluid intake connection.

Still another object is to provide a single exhaust or bleed port from such an integrally formed fluid supply manifold.

A feature of the invention is to provide such a valve module wherein the valve cover and circuit board are associated with conductive members thereon that connect to either piezo monomorphs or piezo bimorphs to provide an electrical connection thereacross while sealing against fluid leakage from the valve body.

A further object of the present invention is to provide an improved valve module including a circuit board that is electrically connected to circular piezoelectric actuators by flex circuits.

A feature of the invention is to provide valve modules of the preceding object wherein one of the flex circuits includes a pressure sensor therein for sensing pressure in a fluid cavity within the valve module.

A still further feature of the invention is to provide such a valve module with such a flexible circuit connection in the form of a pair of flexible circuits including a top flex circuit connection and a bottom flex circuit connection connected respectively to the top and bottom surfaces of each of the circular piezoelectric actuators.

Yet another feature of the invention is to provide such flexible circuits wherein the electrical connection to each of the piezoelectric actuators is by a copper trace pattern that is solder bonded.

Still another feature of the invention is to provide such flexible circuits that are directed through a top valve cover at a rectangular opening therein and sealed with respect thereto to provide a seal between a circuit board assembly and a fluid cavity within the valve module.

Still another feature of the present invention is to provide such circular bimorphs or monomorphs wherein a direct acting flow control is provided by a sealing member bonded to a ceramic layer of the circular bimorphs or monomorphs and wherein the sealing member is a circular disc formed by a layer of silicone material bonded to the ceramic by a suitable adhesive.

Still another object of the invention is to provide a valve module having circular bimorphs or monomorphs that support a sealing member and are operative to directly control high volume flow from a cavity formed by a top valve cover joined to a valve body by a laser weld connection that seals the valve module cavity.

A still further feature is to provide a valve module as set forth in the preceding object including a manifold formed integrally of the valve body supporting the circular bimorphs or monomorphs.

Still another object is to provide a pneumatic seating system wherein a first valve module, as described above, is provided in a seat pan and a second such valve module is provided in a seat back, and wherein an electrical ribbon cable connects the modules as a unit and an air tube connects from a pump in the seat pan to the module in the seat back.

A further feature of the present invention is to provide an improved process for hermetically sealing the valve modules of the present invention without cracking piezo material on valve actuators sealed within the valve module.

A still further feature is to provide such a process in which the valve body and valve cover of the valve module are provided as polyimide material that are joined at a line to line contact and sealed upon application of a laser welding beam to the line to line contact between the valve body and the valve cover.

A further object of the invention is to provide a process in which the ceramic discs of the bimorphs or monomorphs are formed by a tape cast process in which ceramic with piezoelectric properties is squeegeed onto a moving plastic substrate similar to a conveyor belt; in this case a flexible material such as polyester film; the substrate traverses through a low temperature oven, e.g., 140–200° F.; thereafter the piezo material is in a dough-like consistency with a thickness range of 0.006–0.010 inches. The polyester sheet and ceramic coating is rolled at the exit from the low temperature oven. The roll is unwound at a cutting station and piezo discs are cut from the unwound roll in a similar manner as cutting cookies. The cut discs are then fired in a high temperature oven, e.g., 1000–1400° F. The fired ceramic discs are then polarized and bonded to a 0.002 inch thick diaphragm. A top silver electrode is silk screened on each ceramic disc and if desired an annular shaded solder mask is applied at the O/D of the ceramic disc to avoid electrical shorts.

Still another object of the present invention is to provide an improved piezo actuated fluid control valve having a pair of resilient sealing elements carried by a single piezo actuated diaphragm to control flow through a pair of inlets;

Yet another object of the present invention is to provide the fluid control valve of the preceding object wherein the valve is controlled to produce a mixing valve operation.

Still another object of the present invention is to provide the fluid control valve of the preceding object wherein the valve includes a bimorph having a pair of oppositely disposed resilient valve elements thereon that are selectively position with respect to valve seats for controlling fluid flow between a first inlet and a second inlet connected to first and second housing members having a fluid cavity there between for mixing fluid from the first and second inlets for discharge through an exhaust.

Yet another object is to provide an improved hermetically sealed fluid cavity within a fluid control valve assembly having a flow passage selectively opened and closed by a valve actuator characterized by the cavity formed within a pair of oppositely facing housing members and with one of the oppositely facing housing members having a cavity therein surrounded by a peripheral surface connected to the other of the oppositely facing housing members for hermetically sealing said cavity and a fluid flow port in at least one of said housing members and at least one rib on one of the oppositely facing housing members integrally welded to the other of said oppositely facing housing members for hermetically sealing said cavity.

A feature of the preceding valve assembly is the provision of the at least one rib being a sonic energy concentrator and a channel in the other of said housing members for receiving said sonic energy concentrator and a sonic weld joining the energy concentrator to the channel to hermetically seal said cavity.

Another feature of the valve assembly is that the at least one rib can be joined by a laser weld to said other of said housing member for providing a seal therebetween that will hermetically seal the cavity.

Still another feature of such a valve assembly is that the rib can have an air gap on either side of the at least one rib to enhance contact between the first and second housing members during connection by said laser weld.

Still another feature of the invention is that the air gap on either side of the at least one rib includes an annulus around the rib and a filler of sealant material within the annulus.

Yet another feature is to provide sealant material as glue.

Yet another feature is to provide sealant material as a resilient O-ring.

These and other features and objects will be more apparent with reference to the accompanying drawings wherein:

BRIEF DESCRIPTION OF THE DRAWINGS

FIG. 3 is a sectional view taken along the line 3—3 of FIG. 2 looking in the direction of the arrows;

FIG. 3A is a sectional view showing heat staked standoffs between the cover and a circuit board in the embodiment of FIGS. 1–3;

FIG. 4 is an elevational view of a valve cover for the valve body in FIG. 2;

FIG. 5 is a reduced sectional view showing a circuit board and pressure sensor component on the valve cover of FIG. 4;

FIG. 6 is an enlarged sectional view of region 6 in FIG. 5 showing a pressure sensor detail;

FIG. 10A is an enlarged sectional view of a resilient electrical contact connected to a metal diaphragm in the bimorph valve of FIGS. 2–4;

FIG. 11 is a top elevational view of another embodiment of the present invention;

FIG. 12 is an enlarged sectional view taken along the line 12—12 of FIG. 11 looking in the direction of the arrows and showing valve module components in an exploded relationship for clarity;

FIG. 13 is an enlarged sectional view of region 13 in FIG. 12 showing a peripheral support rib for a diaphragm therein;

FIG. 14 is an enlarged top elevational view of a conductive silicone seal and contact of the present invention;

FIG. 15 is a sectional view taken along the line 15—15 of FIG. 14 looking in the direction of the arrows;

FIG. 16 is a perspective view of a pneumatically controlled vehicle seating system of the present invention including another embodiment of the invention;

FIG. 16A is a diagrammatic view of a motherboard valve module and a remote valve module in the embodiment of FIG. 16;

FIG. 17 is a perspective view of a control valve module in the embodiment of FIG. 16;

FIG. 18 is a bottom elevational view of the control valve in FIG. 17;

FIG. 19 is an enlarged sectional view taken along the line 19—19 in FIG. 17 looking in the direction of the arrows;

FIG. 19A is an enlarged view of region 19A in FIG. 19 showing a pressure sensor located in the top cover of the valve for sensing the pressure within a sealed cavity of the valve module;

FIG. 20 is a top elevational view of the valve body in FIG. 19 with a valve cover removed;

FIG. 21 is an enlarged sectional view taken along the line 21—21 of FIG. 20 looking in the direction of the arrows with two bimorph valves shown and with circuit components removed for clarity;

FIG. 22 is a sectional view of the valve body in FIG. 20;

FIG. 23 is an enlarged view of region 23 of the valve body in FIG. 20 with the bimorph removed;

FIG. 24 is an enlarged sectional view taken along the line 24—24 of the valve body in FIG. 20 (without valve components) looking in the direction of the arrows;

FIG. 25 is an enlarged sectional view taken along the line 25—25 of the valve body in FIG. 20 (without valve components) looking in the direction of the arrows;

FIG. 26 is a top elevational view of the connection of a top flex circuit to a bimorph in the embodiment of FIG. 17;

FIG. 29 is an enlarged fragmentary view of another embodiment of a flex circuit connection for use in the present invention;

FIG. 34 is an enlarged fragmentary view of the fixture shown in FIG. 33;

DETAILED DESCRIPTION OF PREFERRED EMBODIMENTS OF THE INVENTION

Figure 1:
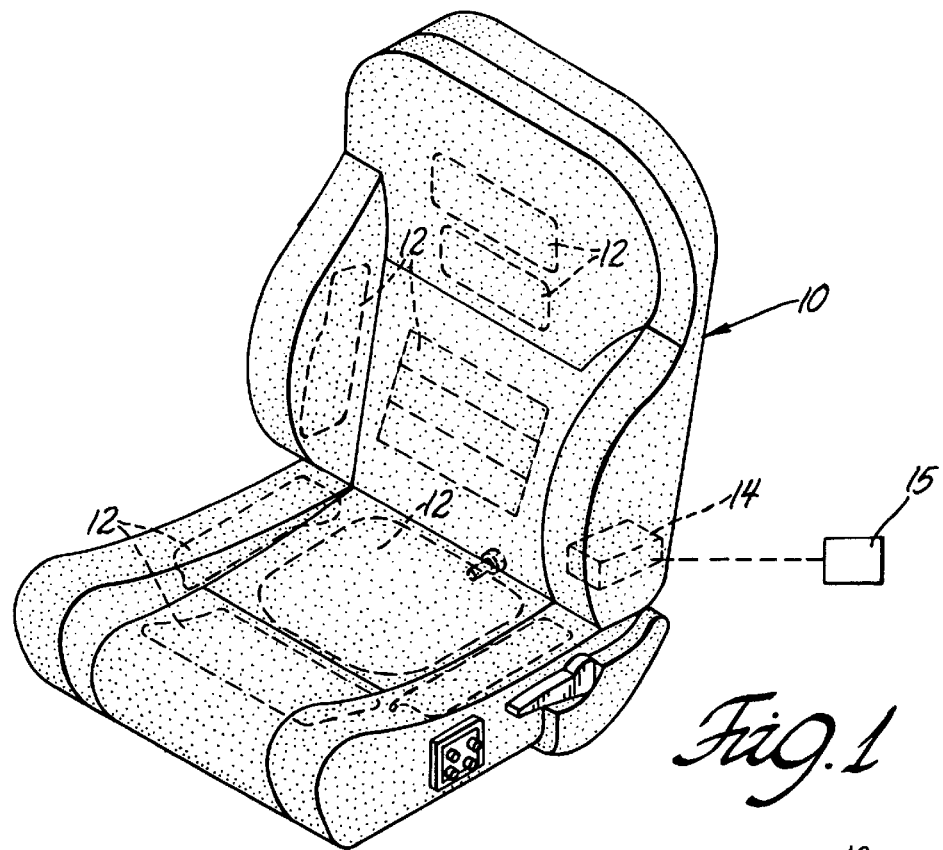
FIG. 1 is a diagrammatic view of a seat having a pneumatically controlled air cell system therein.
Figure 2:
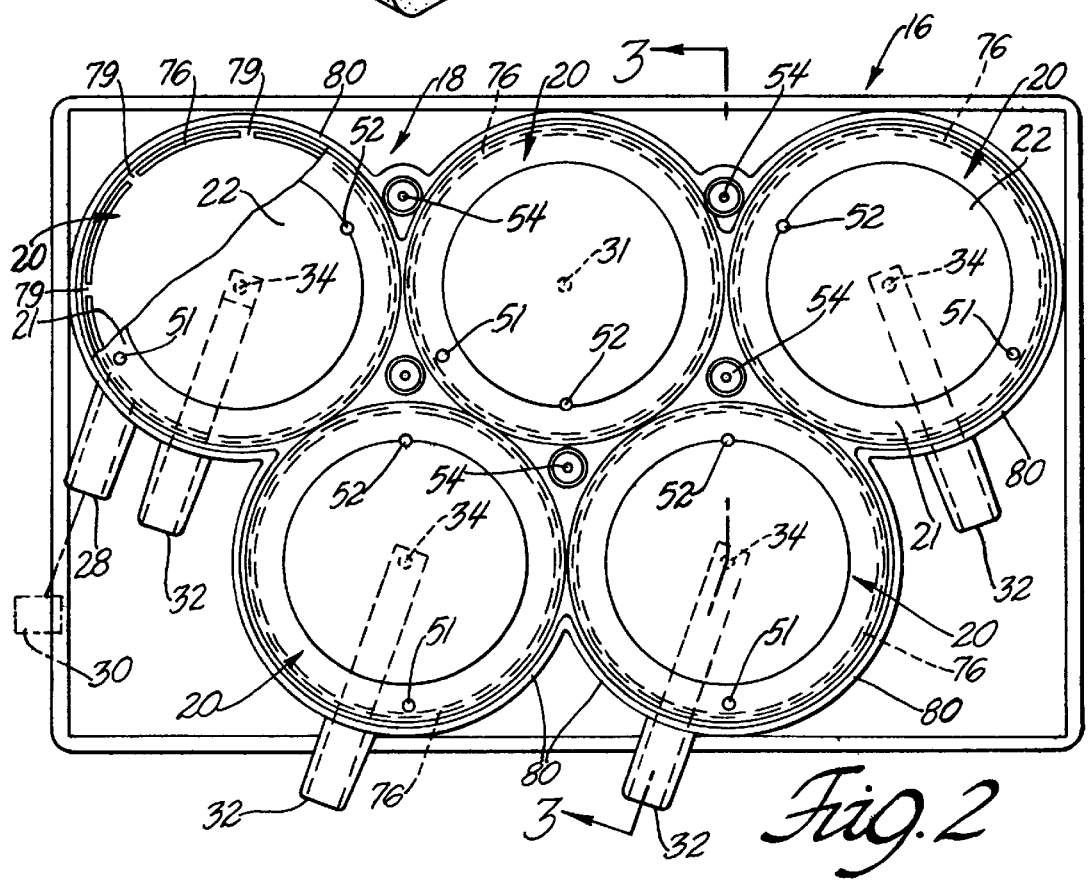
FIG. 2 is a plan view of a valve body and bimorphs in one embodiment of the invention with a cover removed for clarity.

FIG. 1 shows a pneumatic seat 10 with air cells 12 therein controlled by a valve module 14 constructed in accordance with the present invention. The valve module 14 can be controlled by known microprocessors 15, for example as shown in U.S. Pat. No. 4,655,505 or those shown in copending U.S. Ser. No. 08/808,511, filed Feb. 27, 1997, and commonly assigned to the assignee of the present invention. For purposes of applying control signals to the valve module 14, the microprocessor in the '511 application is incorporated herein by reference. As shown in FIGS. 2 and 3, the valve module 14 in FIG. 2 includes a multi-valve unit 16 having a valve body 18 housing either several monomorphs or several bimorphs 20, to be described.

Figure 8:
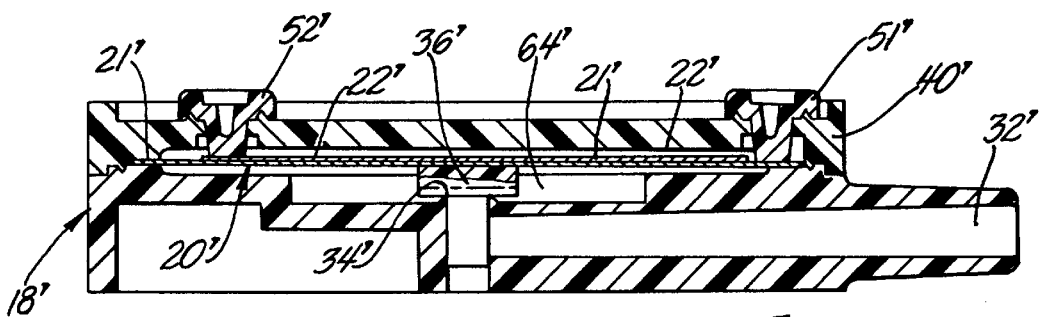
FIG. 8 is an enlarged sectional view of a monomorph valve taken along the line 8—8 of FIG. 7A showing conductive rubber seals and contacts.

In the embodiment of FIG. 2, the valves are bimorphs each of which includes a circular metal diaphragm member 21 having a first circular ceramic disc 22 bonded to the top surface thereof and a second circular ceramic disc 23 bonded to the bottom surface of disc 22. The ceramic discs 22, 23 have external surfaces 24, 25 coated with a conductive noble material such as silver or a gold alloy. The ceramic discs 22 are electrically connected to a voltage source, as will be described, to provide a piezo actuation of a sealing disc in a manner to be described. When voltage is imposed across the ceramic discs they will change from a flat shape to a spherical shape. The change in shape deflects the metal diaphragm member 21 into a spherical configuration where its center region 21a is spaced from a retained peripheral edge portion 21b thereof. In FIG. 8 a monomorph 20' is shown having a ceramic disc 22' that is connected on top of a 0.002 inch thick steel metal shim 21'. The ceramic disc 22' is connected across a power source by a conductive seal member 52' that contacts the ceramic disc 22' and by a conductive seal member 51' that contacts the steel shim 21'. When a voltage is imposed across the conductive seal members 51', 52', the ceramic disc 22' will dish the disc 22' into a spherically formed shape to cause a seal member 36' to be located in sealing contact with a valve seat 34'.

In a preferred embodiment, the ceramic discs are formed by a tape cast process in which the ceramic discs of the bimorphs or monomorphs are formed by a tape cast process in which ceramic with piezoelectric properties is squeegeed onto a moving plastic substrate similar to a conveyor belt, in a preferred, in this case a flexible material such as polyester film. The ceramic coated substrate traverses through a low temperature oven, e.g., 140–200° F.; thereafter the ceramic piezo material is in a dough-like consistency with a thickness range of 0.006–0.010 inches. The polyester film sheet and ceramic coating is rolled at the exit from the low temperature oven. The roll is unwound and passed to a cutting station and piezo discs are cut from the unwound roll in a similar manner as cutting cookies to form a laminated disc having a layer of plastic and a layer of ceramic. The cut discs are then fired in a high temperature oven, e.g., 1000–1400° F. The fired ceramic discs are then polarized and bonded to a 0.002 inch thick diaphragm. A top silver electrode is silk screened on each ceramic disc and if desired an annular shaded solder mask is applied at the O/D of the ceramic disc to avoid electrical shorts.

In the prior art '286 patent, a less cost efficient process is used to form the ceramic piezo material. While suitable for use in the present application, the prior art process involves formation of a billet having a desired shape; the billet is fired and then cut by use of a diamond saw. The aforedescribed process of the present invention avoids the need for cutting hardened brittle material and as such eliminates the possibility of breakage and excessive waste.

In the embodiment of FIG. 2, five bimorphs formed with one such ceramic disc on one side of a metal circular diaphragm are arranged in a staggered configuration on a valve body 18 having an air intake port 28 connected to a source of pressure 30 such as an electric motor driven pump of the type provided in the '511 application. A vent port 31 is provided for exhausting pressure from the air cells 12 depending upon the operating mode of the system. Valve body 18 further includes a plurality of air ports 32 each adapted to be connected to a pressurizable component such as one of the air cells 12 in a pneumatically adjustable seating arrangement, representatively shown in FIG. 1.

While a seat configuration is shown, it is recognized by those skilled in the art that the valve modules of the present invention have application in any comfort seating or bed application. Furthermore, the application and use of the valve module is not limited to seating or support surface applications but are applicable to any environment in which compactness and low energy consumption are desired. Many examples of applications are possible and an enumeration thereof includes, without limitation, the medical arts field; aerospace and aeronautics and any other application wherein it is desired to control the pneumatic or other pressure of a system for operating a device or environment.

As shown in FIG. 3, the valve body 18 has a plurality of raised valve seats 34 having a "volcano cone" shape. A valve seat 34 is provided for each of the bimorphs. More specifically, a resilient sealing member 36 in the form of a silicone sealing disc physically latched to the bimorph 20 is connected to each of the bimorphs 20 adjacent the center thereof and is moveable between open and closed position with respect to the raised valve seat 34 depending upon the voltage imposed across a bimorph 20 for controlling air flow between the air intake port 28 or vent 31 and one or more of the air ports 32. When closed, the sealing member 36 is pressed into the valve seat 34 to close the valve and to compensate for tolerance variations. Also, the engagement will define a travel limit. As shown in FIG. 3, manifold channels 37 are provided at seven locations in the valve body 18 to interconnect fluid chambers 64 under each of the bimorphs 20.

Figure 9:
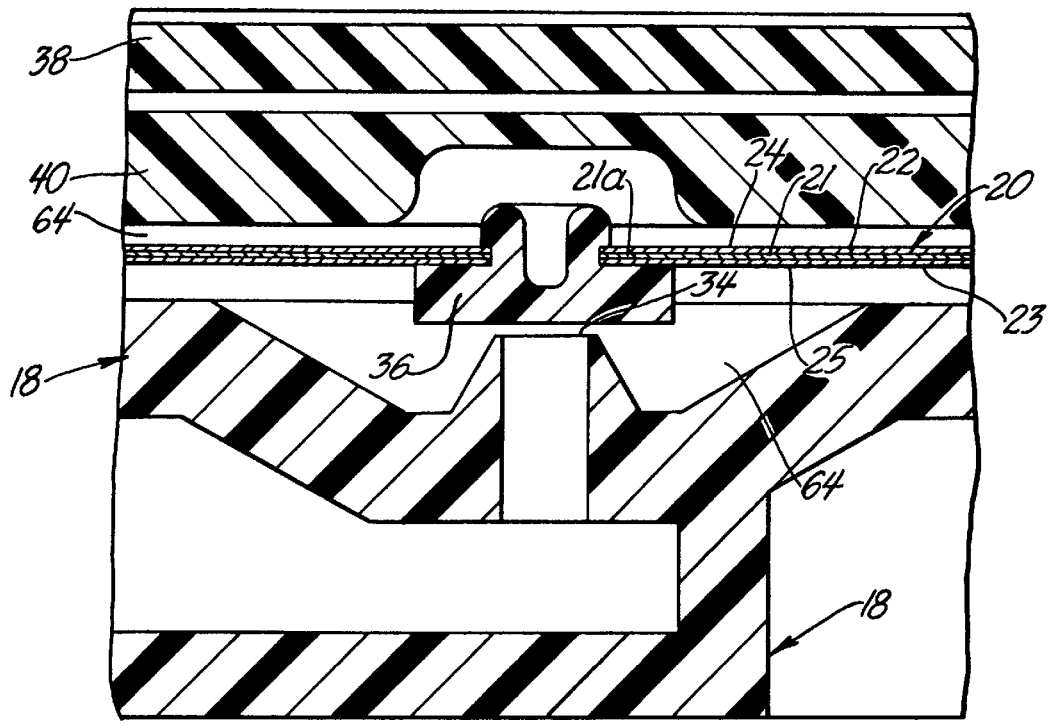
FIG. 9 is an enlarged sectional view of a resilient valving element and raised "volcano" type valve seat in the embodiment of FIGS. 2–4 of the present invention.
Figure 10:
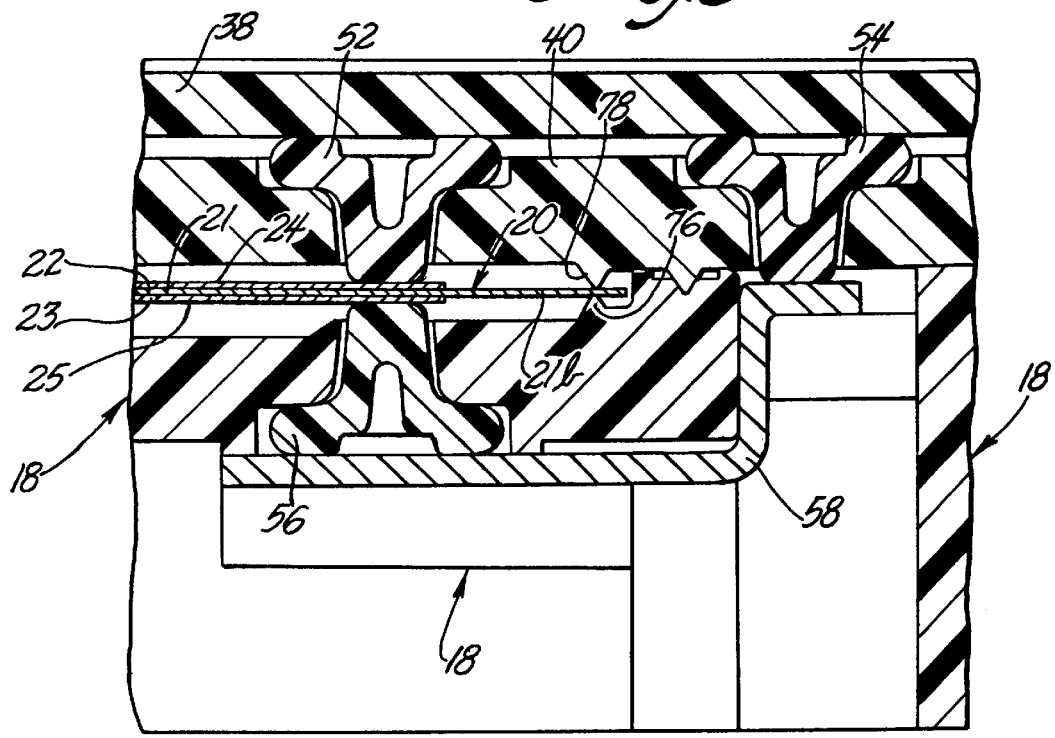
FIG. 10 is an enlarged sectional view of resilient electrical contacts for directing the operating voltage across the circular ceramic bimorph of the present invention in the embodiment of FIGS. 2–4 of the present invention.

FIG. 9 shows an enlarged view of the volcano type valve seat 34 that is opened and closed by the resilient valve disc 36 connected to the bimorph 20. FIG. 10 is an enlarged sectional view through line 10—10 in FIG. 2 (when the valve cover is in place) showing conductive seal members 52,54,56 for supplying power across the ceramic discs 22, 23 of the bimorph 20. FIG. 10A is an enlarged sectional view of the conductive seal member 51 for supplying power to the metal diaphragm 21 that supports the piezo elements 22, 23.

The voltage supply for the bimorphs in the embodiment of FIGS. 2–4 is provided by a circuit board 38 heat staked to a valve top cover and circuit board enclosure 40 that is ultrasonically connected to the valve body 18 at interface 42 defined by an ultrasonic weld 43 there between shown in FIGS. 3, 3A. The top cover/enclosure 40 is connected to the valve body 18 for enclosing the monomorphs or bimorphs and is configured to be connected to the circuit board by heat stakeable posts 44 thereon, as shown in FIG. 3A. The top cover/enclosure 40 also is configured to provide a cavity 40a for the circuit board and is arranged so that following connection of the circuit board, a suitable electromagnetic interference (EMI) shield 46 covers the circuit board 38 and a board enclosure cover 50 is connected and sealed to an upper sealing edge of the valve top cover and circuit board enclosure 40.

FIGS. 5 and 6 show a pressure sensor 70 mounted on circuit board 38 includes an inlet 72 in communication with a fluid chamber 64 formed above and below each of the bimorphs. The inlet 72 is sealed with respect thereto by an O-ring seal 74. The pressure sensor provides a pressure control signal for the control module 15.

A feature of the invention is that a plurality of electrically conductive (conductive silicone) resilient seal members 51, 52, 54 are engaged with the circuit board 28 and directed through the top cover/enclosure 40 so as to be biased between the top cover/enclosure 40 and the top of the bimorph 20 for providing a conductive path between the circuit board and each of the bimorphs. As best shown in FIG. 10, another resilient, electrically conductive seal member 56 is carried by the valve body 18 and is arranged to be biased against the bimorph on a bottom surface thereof that is opposite to the bimorph contact surface for the first resilient, electrically conductive seal members 52. An electrically conductive bridge 58 is connected to the valve body 18 by a staking rib 18b for electrically connecting the conductive seal member 56 to the electrically conductive seal member 54 on the circuit board 38. An array of such electrically conductive seal members and bridges are selectively connected to a power source by the controller 15 to provide a voltage differential across each of the monomorphs or bimorphs in accordance with the output from a control module of the type shown in the '511 application, while sealing against leakage from air flow compartments within the valve module.

A conductive sealing member is more particularly shown in FIGS. 14 and 15. Each of the conductive sealing members 51, 52, 54, 56 are similarly configured with a recessed head 62 that is compressed between either circuit board 38 and top cover/enclosure 40 or valve body 18 and bridge 58 in the final assembly as best seen in FIG. 10. The recessed head 62 thus serves as a seal against fluid leakage from a fluid chamber 64 that is communicated across one of the valve seats 34 with either the air intake 28 or one of the air ports 32. The conductive sealing members 51, 52, 54, 56 each have a tapered contact distal portion 66 that is firmly biased into contact with the bimorph as shown in FIGS. 10 and 10A to provide a conductive path thereacross so that when the controller imposes a voltage thereon a suitable change in shape will occur to provide a desired valving action. The contact points of the respective conductive sealing members on the top of the bimorphs 20 are best shown in FIG. 2 at reference numerals 51, 52, 54. The bottom contact point of the conductive sealing member will be on the underside of the bimorph 20 opposite the point shown at reference numeral 52 in FIG. 2.

In order to provide a configuration in which the change of shape of one ceramic layer on a monomorph or two ceramic layers on a bimorph will shape the metal diaphragm from a flat plane to a spherical shape, the outer periphery of the metal diaphragm is captured at its outer peripheral edge between raised tapered ribs as best shown in FIG. 10 at 76, 78 that extend circumferentially of the diaphragm 21 with suitable gaps 79 therein to equalize pressure across the diaphragm 21.

In the case of a monomorph, two conductive seal members are required to supply power across the single ceramic disc as shown at 51', 52' in FIG. 8.

Figure 7A:
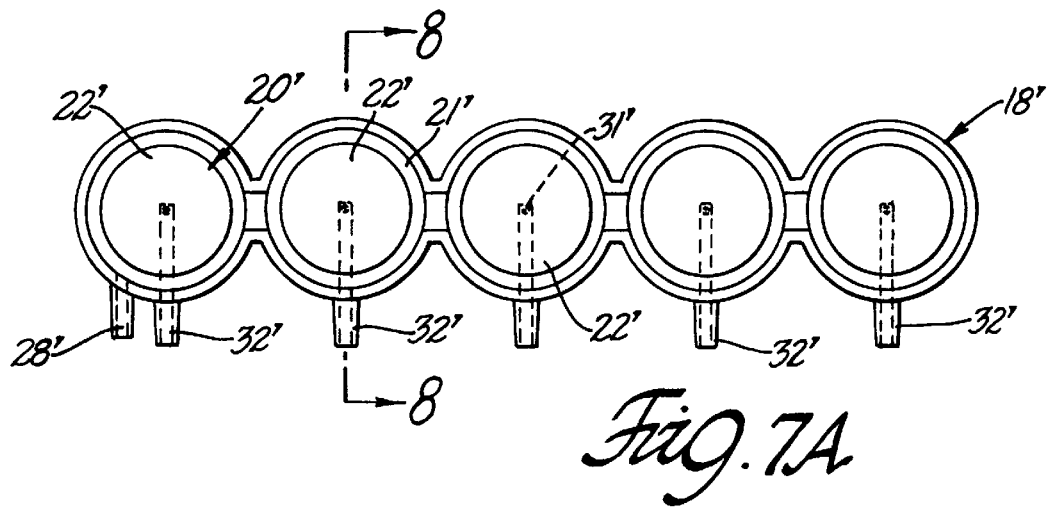
FIG. 7A is an elevational view of another embodiment having a valve body with in-line valve components including monomorphs of the present invention.

In the embodiment of FIG. 7A, a five-valve module using monomorphs is shown in which the valve has a valve body 18' with an air intake 28', a vent 31' and four air ports 32'. In this in-line embodiment, each of the metal diaphragms 21' has one ceramic disc 22' thereon for deflecting the valve by piezo action. The ceramic disc 22' is located in a part of the fluid chamber 64' that is pressurized but does not have air or fluid flow thereacross. It is believed that such disposition of the ceramic disc will reduce cracking of the noble metal protective layer due to dynamic fluid flow thereacross and thus reduce migration of the protective coating through the crack. Consequently, the life of the valve module is extended.

Figure 7B:
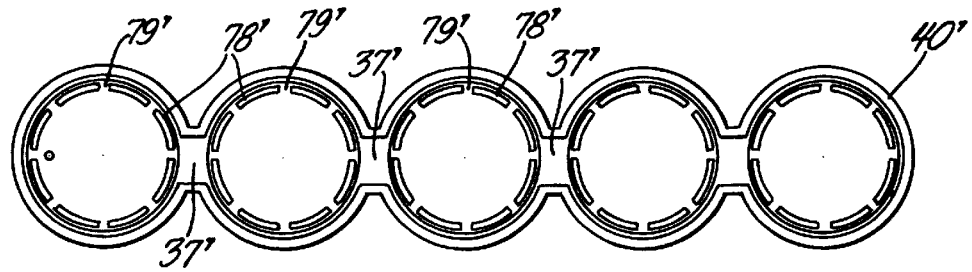
FIG. 7B is an elevational view of a cover for the embodiment of FIG. 7A.
Figure 8A:
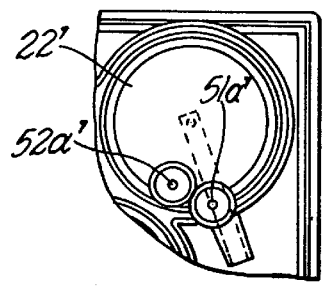
FIG. 8A is a fragmentary top elevational view of another embodiment of a monomorph valve with its cover removed.

A cover 40' for the valve body 18' is shown in FIG. 7B. As previously explained, two conductive seal members 51', 52' connect to the diaphragm 21' and ceramic disc 22', respectively, to provide current across the monomorph 20'. In another embodiment the conductive seal members can be arranged as shown in FIG. 8A at 51a' and 52a'. The conductive seal member 51a' contacts the metal diaphragm of the monomorph and the conductive seal member 52'a contacts the ceramic disc of the monomorph.

In both FIG. 8 and FIG. 8A, the circuit board is omitted for clarity. As shown in FIG. 8 the monomorph carries a resilient sealing disc 36' that can be connected by suitable adhesvie to the underside of the diaphragm 21' that is positioned when the monomorph is connected across a power source to open and close a valve seat 34' on the air flow side of fluid chamber 64', depending upon whether or not current is passing through the ceramic disc 22' of the monomorph 20'.

The embodiment of the invention shown in FIGS. 11–13 includes a plurality of stacked valve bodies 18" that are enclosed by covers or end caps 40", 81". The top cover 40" has an air intake 28"; a valve seat 45"; a rib 78" for supporting a monomorph 20"; a relief path thereacross through a gap 79" therein for equalizing pressure in a valve cavity 64". A valve body 18" connected to the cover 77" has a rib 76" with gaps 79" therein for supporting the monomorph at a point thereon opposite the rib 78" on the cover 77". The gaps 79" are shown somewhat diagrammatically in FIG. 13. The cover 81" has a port 83" for a pressure sensor that is operative to determine the pressure at each of a plurality of supply ports 32" when respective ones of the monomorphs 20" position a sealing member 36" thereon away from a valve seat 45". Each valve body 18" supports a metal diaphragm 21" having a circular ceramic disc 22" thereon forming a monomorph 20". Certain of the valve bodies 18" have an air port 32" for connection to an air cell or other pressurizable device. One of the valve bodies includes a vent port 31". Each monomorph 20" carries a resilient seal 36" moved to open and close a valve seat 45". Suitable contacts for energizing the monomorphs are provided at 51", 52".

While various embodiments have been described, they all are characterized by having a reduced number of assembly parts. Like parts in the various embodiments use the same reference numeral primed or double primed. In the case of the staggered 5 valve embodiment shown in FIGS. 2–4, unusual compactness is obtained though in all cases a compact valve module is possible. Furthermore, in all of the embodiments, the use of the circular formed bimorph or monomorphs enable ease of assembly and compactness not found in prior art piezo effect valve assemblies.

In the aforesaid embodiments of the invention, the piezoelectric actuator uses a modified buzzer element rather than the cantilevered member of U.S. Pat. No. 5,447,286 to actuate a sealing disc that directly opens and closes a high flow passage. The device as described above is a valve that is intended for use in controlling air flow to air cells in automotive and commercial seats or beds.

The valve modules, in summary, consist of the following:

Valve body 18, 18', 18" that includes vent port 31, 31' 31" that is routed to the exhaust supplying air to the cell.

A silicone seal 36, 36', 36" or a similar soft rubber material either bonded to the diaphragm or overmolded to the valve body.

A 50 mm dia. diaphragm 21, 21', 21" and a 41 mm dia. ceramic disc 22, 22', 22" that is herein described as a monomorph or a bimorph. With the monomorph construction, the ceramic can be on the opposite side of the air flow except when stacked as in FIG. 13. This reduces moisture absorption to the ceramic, reducing silver migration to the steel diaphragm.

The conductive rubber contacts (3 for a bimorph) are used to provide two characteristics; a seal to hold pressure in the valve and a conductive rubber seal to transfer current from the circuit board to the device.

A top cover 40, 40', 40" that provides a seal via energy directors that form ultrasonic welds (shown at reference numeral 43 in FIG. 2).

The top cover 40 also doubles as an enclosure for the electronics after the electronics are heat staked in place creating the seal to the valve cover enclosure.

The value of this valve is that it can be built in multiples. The Astec™ system, sold by the assignee of this application, requires 4-2 cones (valve seats) to air intake ports and 1 bleed. That is made clear in the accompanying drawings.

A 5-bank valve is cost effective because of the lesser part count it provides and the minimum labor required for assembly. The present valve shown in the '286 patent has 16 parts per valve and 18 valves totaling a part count of 162 pieces. The new design of the present invention for a 5 bank valve (with direct flow control) as shown in the embodiment of FIGS. 2–4, reduces part count to 42 pieces. Cost is reduced by approximately 50 for the valves and a further $ disc. (cost discount) per system for the removal of the manifold. An enclosure is not required further reducing costs.

The use of a monomorph is the least complex device that will actuate the sealing disc. Package size relative to thickness is at a minimum allowing use of integration with customer seating configurations. This package allows a user to position a module in the seat pan and the seat back eliminating the routing of air cell tubing through the seat bite line.

An additional benefit is that multiple leak paths have been eliminated by the embodiment in FIGS. 2–4 (new design) creating a more reliable product.

Referring now to the embodiment in FIGS. 16–30 a vehicle seat 81 is shown having a seat pan 81a and a seat back 81b. A plurality of air cells 83 is provided in the seat pan and in the seat back. Pressure in the air cells 83 is controlled by a controller 85 pursuant to desired programs of the type set-forth in co-pending U.S. Ser. No. 08/808,511. The controller 85 provides selective energization of valve modules 80, 80a and a source of pressure of a known type to regulate the air pressure within the air cells 83. As diagrammatically shown in FIG. 16, the valve module 80 is connected to air cells 83 in the seat pan 81a and the valve module 80a is connected to air cells 83 in the seat back 81b.

Figure 30:
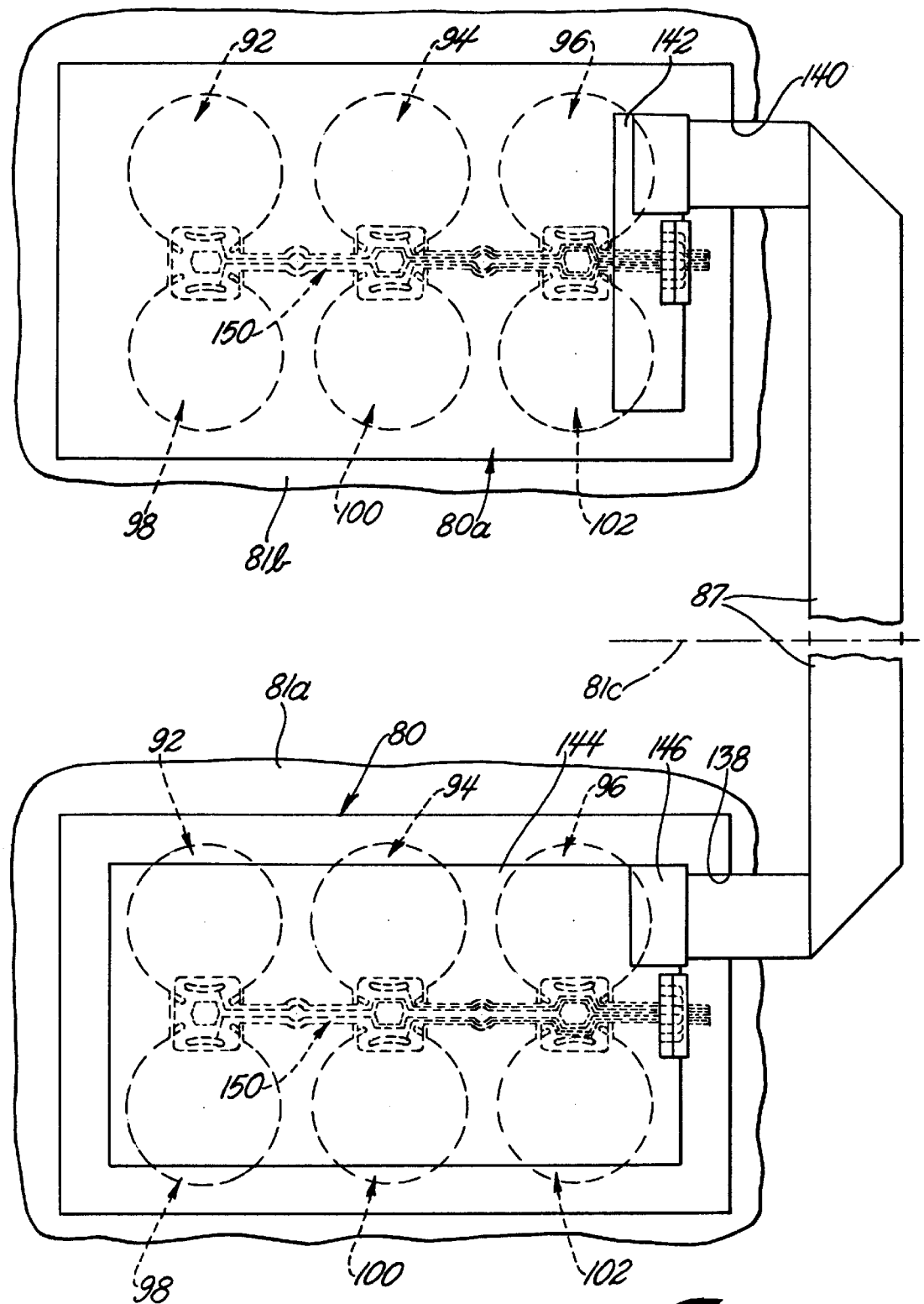
FIG. 30 is a diagrammatic view of the circuit connections between the mother board module and remote module in the embodiment of FIG. 16.

The valve module 80 is a mother board module in the seat pan connected to the air cells 83 therein. As shown in FIGS. 16A and 30, the valve module 80 is connected by a ribbon cable 87 to a remote valve module 80a supported in the seat back 81b. The ribbon cable 87 is selected to have a length and to bridge the seat bite line depending upon a particular application. Furthermore, a preinstalled air connection line 89 is provided between the air inlets to the valve modules. The air connection line is configured to be connected to a source of air pressure such as an electric motor driven pump 91 that is selectively energized by the controller.

The valve module 80 will be described with it being understood that the valve module 80a will have similar features.

The valve module 80 is shown in FIG. 17 as including a valve body 82 closed by a valve cover 84. In accordance with one aspect of the present invention, the peripheries of the valve body 82 and valve cover 84 are joined by a laser weld connection 86 best shown in FIG. 17. The laser weld connection 86 has been determined to provide a fluid seal along a space efficient perimeter wall 88 (FIG. 20). The fluid seal prevents leakage from a fluid cavity 90 through which fluid is controlled by a plurality of bimorphs 92–102. The fluid cavity 90 includes a plurality of compartments sealed at their periphery by the laser weld and interconnected axially by manifold passages 120 (FIG. 18) to be described.

Each of the bimorphs 92–102 includes a circular diaphragm 104 made from a suitable conductive and deflectable material including but not limited to metallic material such as steel. The diaphragm 104 has its outer periphery seated on a sharp edged rib or circular ledge 106 on the valve body 82. The ledge 106 is formed around a circular opening 108 in the valve body 82.

Each diaphragm 104 has a ceramic layer 110 formed as a circular coating extending across part of its top surface and a ceramic layer 112 formed as a circular coating extending across part of its bottom surface; spatial terms such as top, bottom, upper, lower, side, back, front are dependent upon the location of a valve module in an operative environment. In the present case such terms are with reference to the drawings and are not intended to be limiting but rather will depend upon the relative position of the module when in use and the terms will vary in accordance with such positioning.

The ceramic layers 110, 112 are like those described in the embodiment of FIGS. 2–4 and are operative when a voltage is imposed thereacross to deflect the steel diaphragm 104 through a deflection of plus or minus 0.010" in two directions depending upon the polarity imposed across either of the ceramic layers. In accordance with the present invention, in this embodiment the bimorphs 92–102 each have a silicone sealing disc 114 (one shown in FIG. 21) bonded to the surface of the ceramic layer 112 by a suitable adhesive such as Loctite Prism Cyanoacrylate 4204. In one working embodiment the sealing member is a circular disc having a thickness of 0.060 inches and a diameter of 0.25 inches. On a 50 mm diameter bimorph such a sealing disc will provide 300 grams of sealing force when forced by the deflection of the diaphragm against a raised "volcano shaped" valve seat 116 formed around a flow passage 118 in the valve body 82. In operation, when not energized, the bimorphs are flat and the sealing disc 114 is flush to the seat 116. When energized, the bimorph is deflected downwardly so as to force the disc 114 into the valve seat, which serves as a stop limit. The disc 114 has a thickness that will cause it to compensate for tolerance variations and compress into a sealing relationship with seat 116 (shown to the right in FIG. 21).

A manifold 120 is integrally formed in the valve body 82 as best shown in FIG. 18. The manifold 120 has a plurality of fluid connections 122–128 connecting the cavities 90 longitudinally of the valve body 82 and a plurality of fluid connections 130–132 for connecting the cavities 90 transversely of the valve body 82. Each of the flow passages 118 from the valve seats 116 are connected either to a vent passage 134 via fluid connection 134a to the manifold 120 connections or to an air inlet passage 136 via the manifold 120 depending upon which bimorph is opened or closed by the controller 85 for connection to one of the air cells 83.

Furthermore, each of the flow passages 118 are connected to air ports 118a that are connected to suitable preassembled tubing that connects to the air cells at a suitable joint, a representative such joint being set-forth in copending U.S. application Ser. No. 08/892,477 filed Jul. 14, 1997 and assigned to the assignee of this application.

In the embodiment of FIG. 16 air cells 83 can be permanently attached to each of the valve modules 80, 80a and the combined units are then assembled in the seat pan and the seat back (diagrammatically shown at 81a and 81b in FIG. 30) of a given application. The use of permanent attachments enable a system to be leaked checked prior to assembly in a given seat application.

As best seen in FIG. 30, the connector cable 87 is directed through an opening 138 in the valve body 84 in the mother valve module 80. The connector cable 87 is folded and directed across the seat bite line 81c and is refolded and passed through a opening 140 in the valve body 84 of the remote valve module 80a.

The cable 87 connects to a termination board 142 in the module 80a and it connects to termination board 146 on a circuit board 144 in the module 80. The mother board module is connected to the controller 85 and serves to produce signals that are directed from a termination board 146 on the circuit board 144 thence through the connector cable 87 for controlling the operation of the bimorphs in the remote valve module 80a, such bimorphs being of the same configuration as in the mother valve module 80.

In the embodiment of FIGS. 16–30, and as shown in the mother valve module 80, electrical connection across each bimorph 96–102 is provided by a pair of flex circuits 150 comprising a top flex circuit 160 and a bottom flex circuit 166. The flex circuits are made from a high temperature resistant material such as polyimide film sold by Dupont under the tradename Kapton selected so that it can withstand a hot bar solder process to be discussed.

The pair of flex circuits 150 are ribbon shaped, flat flexible members that are positioned between the valve body 82 and the valve cover 84 for connecting the bimorphs to the circuit board 144 in the case of the mother board valve module and to the termination board 142 in the case of the remote valve module 80a.

In both cases, the pair of flex circuits 150 have a segment 152 (as shown in FIG. 19A) thereof routed out of the valve module 80 through a small rectangular opening 154 in the valve cover 84. The valve cover 84 and flex circuits 150 directed therethrough are sealed by an epoxy seal 156 that creates a hermetic seal at the opening 154 to prevent leakage from the fluid cavity 90 into the interior 158 of the valve cover 84.

The pair of flex circuits 150 includes a top flex circuit 160, best shown in FIG. 26 having conductors 160*a* at one end thereof bonded to the circuit board 144 that can be connected to the outer surface of the valve cover 84 like in the embodiment of FIGS. 2–4.

The top flex circuit 160 has conductors 160*a*, 160*b* separated to form a pressure sensor window 164. In the illustrated embodiment four of the conductors 160*a* are on one part of the split and four other of the conductors 160*a* are on the other side of the split. In all cases the conductors are embedded in and separated from the other by an electrical insulating layer 162 of plastic material. The outer ones of the conductors 160*a*, 160*b* are connected to the metal diaphragms 104 of the bimorphs 92, 94, 96 and the inner ones of the conductors 160*a*, 160*b* are connected at the ceramic layer 110 on the top thereof. The electrical connection at such points are provided by copper traces on either the metal diaphragms or the ceramic layers and bonding is via solder on each of the copper traces. In a preferred embodiment the solder is reflowed by a hot bar process wherein the solder is remelted on the copper traces to bond the traces to the silver coating on the ceramic discs of the bimorphs. The heat of the remelt process transfers through the polyimide material of the flex circuit to the copper material of the traces and then to the interface of the solder and the silver coating.

The other three conductors 160*b* are connected in the same manner to bimorphs 98, 100, 102 by copper traces 98*a*, 100*a* and 102*a*.

Figure 27:
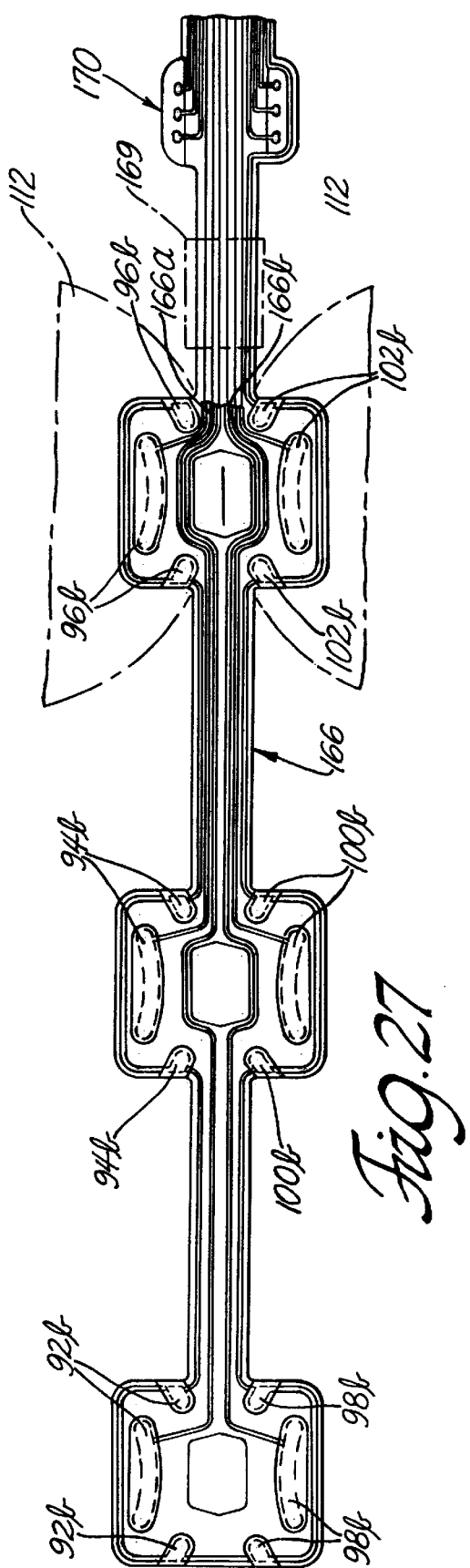
FIG. 27 is a bottom elevational view of the connection of a bottom flex circuit to a bimorph in the embodiment of FIG. 17.

The pair of flexible circuits 150 further includes a bottom flex circuit 166, best shown in FIG. 27, having conductors 166*a* connected to the circuit board 144. As in the case of the top flex circuit 160, the bottom flex circuit 166 is split such that three of the conductors 166*a* will connect to the ceramic layer 112 at copper traces 92*b*, 94*b* and 96*b* respectively. Likewise the other three of the conductors 166*a* are connected to the ceramic layers 112 of bimorphs 98, 100, 102 at copper traces 98*b*, 100*b*, 102*b*. In all cases the conductors are embedded in and separated from the other by an electrical insulating layer 168 of plastic material.

A pressure sensor 170 connected to the bottom flex circuit 166 is positioned within the window 164 of the top flex circuit 160 when the top and bottom flex circuits are positioned as shown in FIG. 19A. The pressure sensor includes an inlet tube 172 that fits into an opening 174 in the valve cover 84 where it is sealed by an O-ring 176. The inlet tube 172 is disposed to sense the pressure within the laser sealed fluid cavity 90 within the valve module so that the pressure in whatever air cell(s) 83 is opened through the air ports 118*a* dependent upon positioning of one or more of the sealing members 114 the bimorphs.

Figure 28:
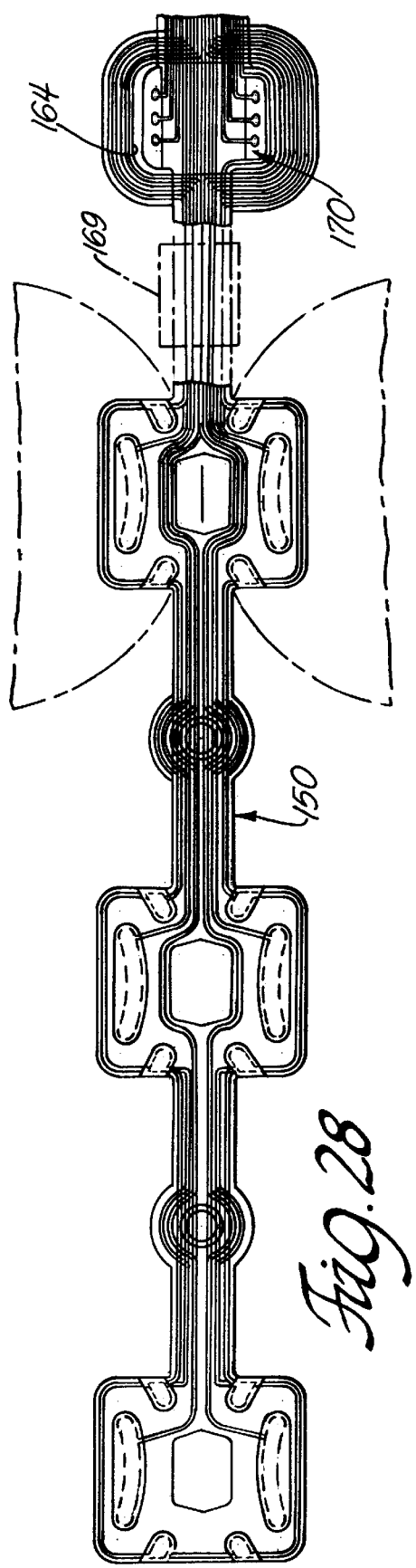
FIG. 28 is an enlarged top elevational view of combined top and bottom flex circuits in the embodiment of FIG. 17.

FIG. 28 is an elevation view that shows the manner in which the pressure sensor 170 is directed through the window 164 to be positioned within the valve cavity by being folded back over the top flex cable 160 as shown at the bend 166*a* in the bottom flex cable as best seen in FIG. 19.

The electrical signal across the copper traces connected respectively to the top and bottom ceramic discs of each of the bimorphs will cause the bimorphs to deflect from flat to spherical so as to control the opening and closing of a seal disc 114 thereon against one of the valve seats 38.

The circuit board is enclosed by an outer cover 178 held by a flexible catches 179 on the top cover that are secured to the valve body 82 as best shown in FIGS. 17 and 19.

FIG. 29 shows another embodiment of the invention wherein a portion 162*a* of the insulating layer 162 for the top flex circuit 160 is extended to the periphery of a bimorph (shown at bimorph 96) to cover the ceramic disc where it is bonded to seal its surface against moisture. Alternatively, the same diameter of the bimorphs can be spray coated with a protective layer of a suitable moisture impervious material after bonding the flex circuits to the bimorphs.

A like arrangement (not shown) is provided on the bottom flex circuit 166 to seal the ceramic disc 112.

Figure 32:
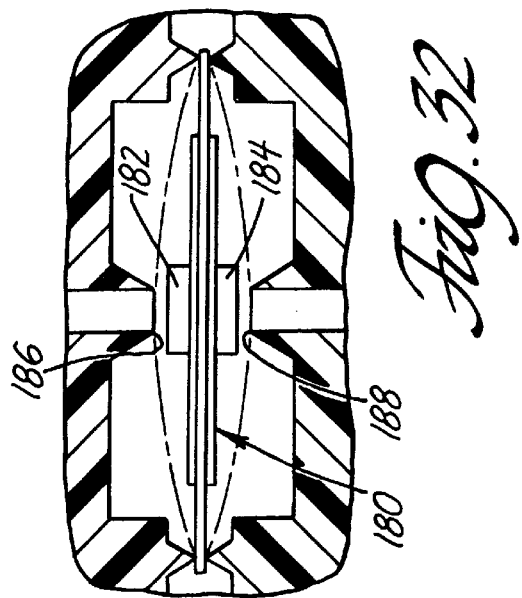
FIG. 32 is a diagrammatic view of a bimorph controlling flow through plural ports.
Figure 31:
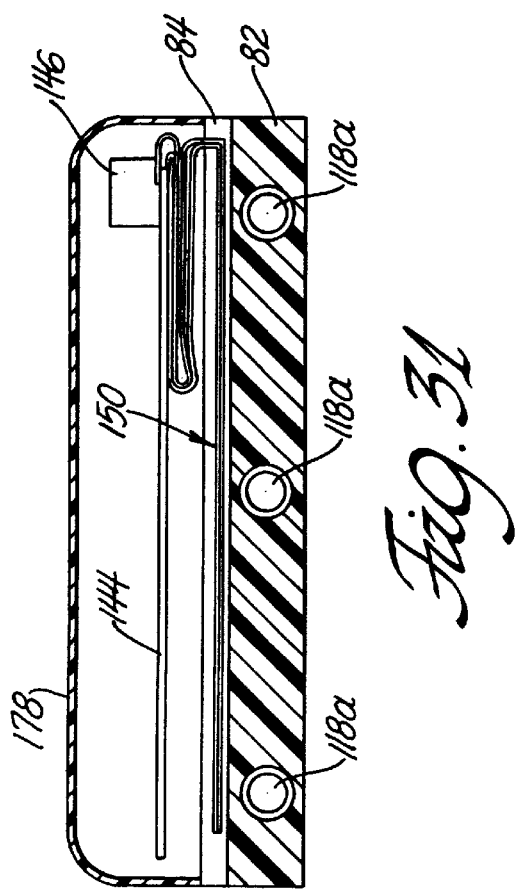
FIG. 31 is a somewhat diagrammatic side view of the mother board module in FIG. 31.

In accordance with another aspect of the invention, shown diagrammatically in FIG. 32 a bimorph 180 carries two valve discs 182, 184 that open and close two valve seats 186, 188.

In accordance with another aspect of the present invention, the ultrasonic weld shown in FIGS. 2–4 is replaced by a laser weld process. In some cases the use of ultrasonic welds to connect a valve body to a valve cover of a multi-valve valve module can result in undesirable operation. For example, it has been found that a 5-valve module and a six-valve module that use a shear joint type ultrasonic weld can result in uneven forces around the periphery of the module such that the piezoelectric material on the bimorphs or monomorphs will crack resulting in unacceptable levels of rejection for the finished modules. The problem with a hermetically sealed unit, once the valve cover and valve body are joined and the valve is tested, it is difficult to replace a damaged bimorph or monomorph.

Furthermore, such uneven processing forces can result in microcracking that will only propagate following a number of operating cycles and thereby adversely affect module performance at a time after an initial quality check when the unit is assembled. Thence, the fault is only determined after the unit has operated for a period of time still within a warranty period. In such cases, replacement is more difficult since the valve modules are assembled within the vehicle seating structure and replacement therefor is more expensive than would be rejection of a unit tested immediately following the initial assembly process.

Figure 33:
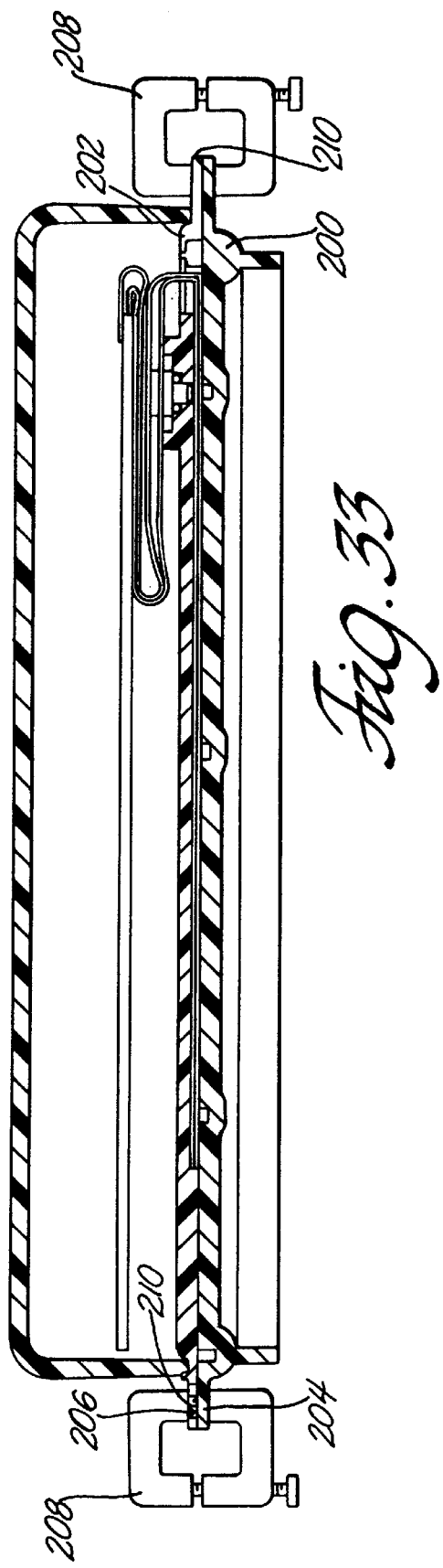
FIG. 33 is a diagrammatic view of a fixture used in a laser welding process of the present invention.

Thus, in the preferred embodiment such as the 6-bank valve module in FIGS. 17–32 a laser weld is provided by use of the laser process of the present invention shown in FIG. 33.

In accordance with this aspect of the present invention valve body and valve cover are injection molded from polyimide material polyetherimide (PEI) such as sold under the trade mark Ultem® by GE Plastics. The valve body 200 and valve cover 202 are shown diagrammatically in FIG. 33 with respect to laser welding fixtures and a laser. It will be understood that the valve body 200 will have seats for piezoelectric actuators shown in the preceding embodiments. Electric connections will also be provided therein. The actuators and electric connections will be placed within the valve module and the perimeter flanges 204, 206 of the valve module will be clamped at a fixture 208 to create a holding force at a line to line interface connection 210 around the perimeter flanges 204, 206. If further clamp action is required a vacuum source can be connected through a valve body port and the other valve body ports can be sealed such that the cavities between the valve body and the valve body cover will be evacuated to further pull the flanges 204, 206 together by virtue of the exterior ambient pressures acting thereon.

As shown in FIG. 34, each flange 204, 206 has a channel air gap 216, 218 of 0.001 inches on either side of the line to line contact 210 that is defined by ribs 220, 222 formed respectively on the valve body 200 and on the valve cover 202 in facing relationship to form the line-to-line contact 210. The side gaps 216, 218 enhance intimate contact at the interface at which the laser focal point 224 is placed during laser operation. Once clamped and evacuated the flanges are welded along a perimeter by use of an SDC Laser Model # FO25-4292-001 to produce a laser weld connection as previously described that will hermetically seal the cavities between the valve body and the valve cover. The laser is robotically controlled in a known manner to apply laser pulses to the interface 210 for producing a laser weld connection therebetween. In one embodiment, the laser welding is by a laser diode based welder operated from 5 to 30 watts. The top valve cover is transparent to the laser and the lower valve body is laser energy absorbent. In contrast to ultrasonic welding processes, the present invention does not impart any vibration energy to the interface 210 leaving the piezoactuators undamaged. As a consequence, the process results in improved manufacturing quality with less rejection of parts and improved field performance that leads to less warranty claims. The process is especially suitable for producing a hermetically sealed cavity within valve modules having complex configurations of the type set forth in the previously described embodiments. A further reason for use of the improved laser welding process to join the valve body and the valve cover of the valve modules of the present invention is that a hermetic seal by use of adhesive or sonic weld connections on parts of this size may not be possible to achieve.

Figure 35:
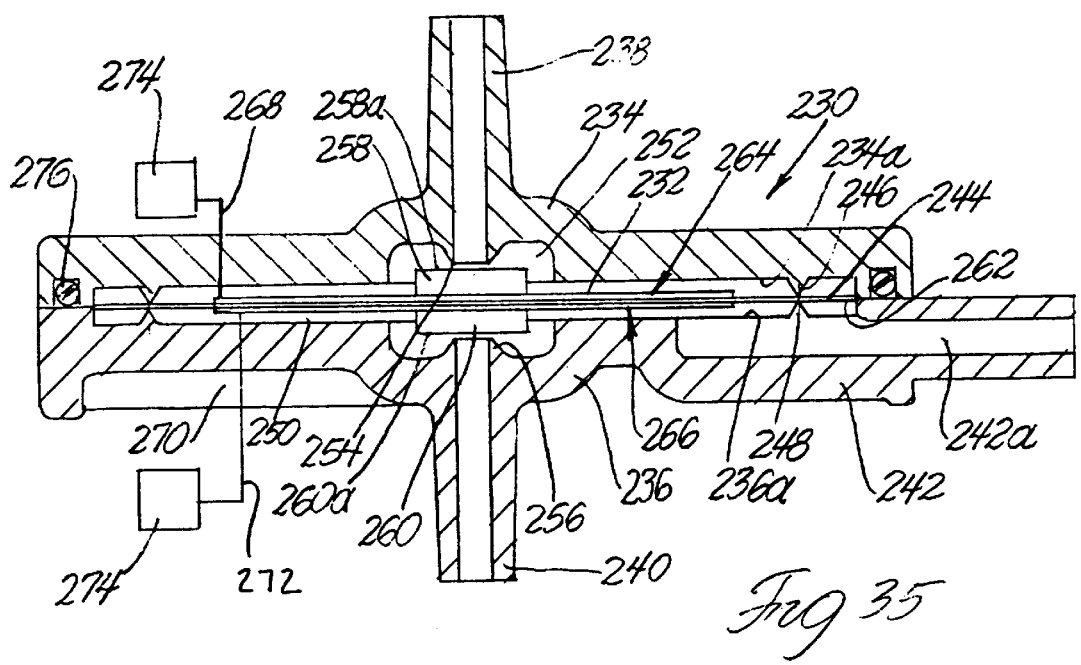
FIG. 35 is a sectional view of a metering valve constructed in accordance with the present invention.
Figure 36:
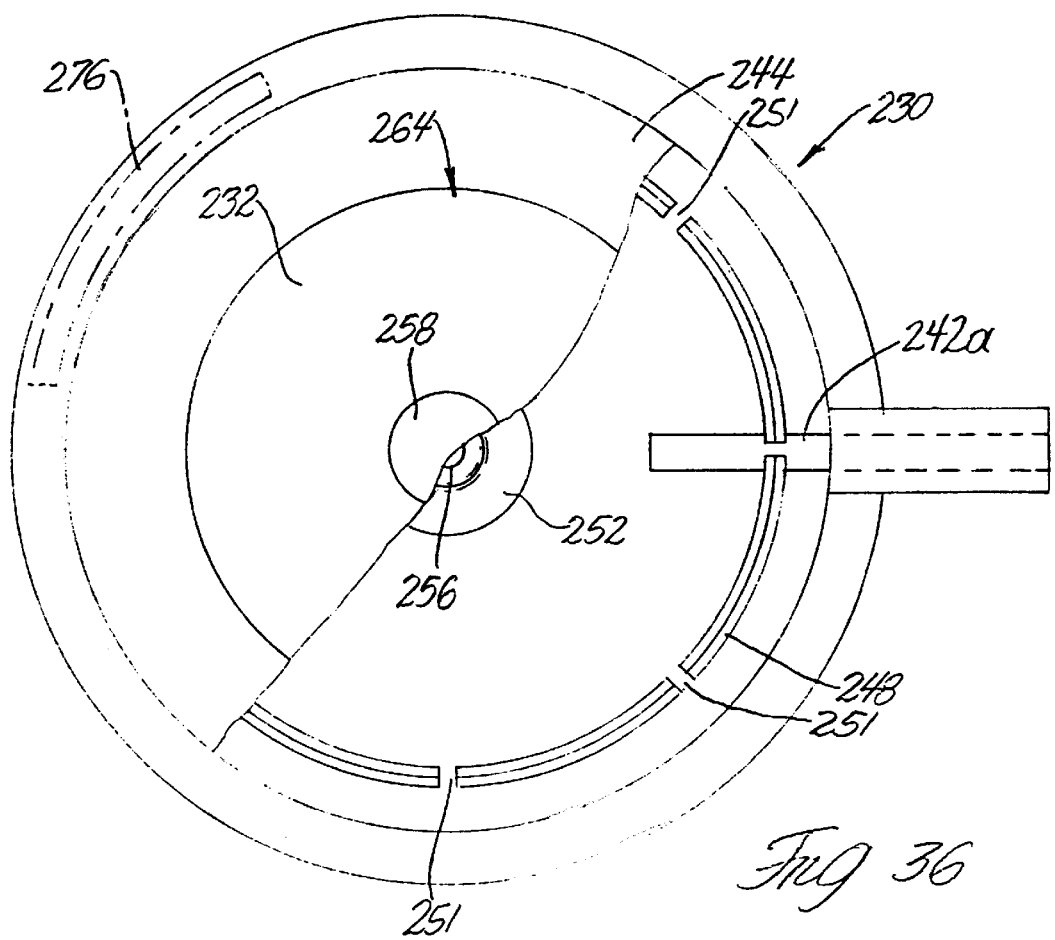
FIG. 36 is a fragmentary top elevational view of the metering valve in FIG. 35 shown with a valve housing member removed.

Another embodiment of a piezo actuated valve assembly 230 is shown in FIGS. 35 and 36. In this embodiment the valve assembly 230 has a single piezo actuated bimorph 232 clamped between two valve housing components 234 and 236. As shown in FIG. 35 the housing component 234 is a top cover member having a fluid intake tube 238 formed integrally thereof. The housing component 236 is a bottom member having a fluid intake tube 240 formed integrally thereof. The housing component 236 also has a fluid exhaust or fluid outlet tube 242 formed integrally thereof and extending laterally of the fluid intake tubes 238, 240.

The bimorph 232 includes a metal diaphragm 244 of conductive material, preferably FeNi42 that is clamped at its outer perimeter between first and second support ribs 246, 248 formed respectively on the housing component 234 and the housing component 236 at internally located surfaces 234a and 236a that together define a fluid mixing cavity 250 there between. The fluid mixing cavity 250 has a central region 252 that communicates through the cavity 250 on opposite sides of the metal diaphragm 244 thence through openings 251 in the ribs 246, 248 to the outlet tube 242. The fluid intake tube 238 has a raised valve seat 254 formed on one end thereof at a point located within the central region 252 and the fluid intake tube 240 has a raised valve seat 256 at a point located within the central region 252 on the opposite side of the diaphragm 244.

First and second valve seal members 258, 260 are carried by the bimorph 232 on opposite faces thereof. The valve seal member 258, in a manner to be described, meters fluid flow from the inlet tube 238 across the raised valve seat 254 into the central region 252. The valve seal member 260, in a manner to be described, meters fluid flow from the inlet tube 240 across the raised valve seat 256. The metered flow from each of the inlet tubes 238, 240 is then directed into the central region 252 on either side of the bimorph 230 from whence it flows radially on either side thereof and is directed through openings 251 in the ribs and the metered flow is thoroughly mixed within an outlet region 262 of the fluid cavity 250. The outlet region 262 is communicated with a passage 242a formed through the outlet tube 242.

The bimorph 230, more particularly, includes a top layer 264 of piezoelectric material that is bonded to the upper surface of the diaphragm 244. The bimorph 230 further includes a bottom layer 266 of piezoelectric material that is bonded to the lower surface of the diaphragm 244. The top and bottom layers 264, 266 are selectively connected to a power source through suitable connectors shown diagrammatically at 268, 270, 272 in FIG. 35 and to a suitable programmable controller 274 for directing different levels of voltage across either of the top layer 264 or bottom layer 266. Depending upon the operating program, the piezo material will shape the diaphragm 244 to move the seal members 258, 260 into a precise position that locates the flat surface 258a, 260a thereon in spaced relationship with respect to the raised valve seats 254, 256, respectively associated therewith.

For example, if limited flow of a first fluid is to pass through the inlet tube 238, the top layer 264 will be energized to shape the diaphragm 244 to be bent upwardly in the direction of the raised valve seat 254 to a position to restrict (but not necessarily close) fluid flow ($Q_1$) through the inlet tube 238. At the same time, the valve seal member 260 will be positioned away from the raised valve seat 256 to allow unrestricted flow ($Q_2$) through the inlet tube 240. As a consequence a controlled ratio of fluids ($Q_1/Q_2$) flows into the mixing portion of fluid chamber 250 wherein $Q_1<Q_2$. Equal quantity mixing of fluids from inlet tubes 238, 240 will take place when the top and bottom layers are deenergized. If greater quantities of fluid passing through the inlet tube 238 are required the opposite energization mode is employed with the bottom layer 266 being energized to cause the diaphragm to bend so as to restrict flow between the valve seal member 260 and the raised valve seat 256 while opening the flow through the inlet tube 238 by positioning the valve seal member 258 a greater distance from the raised valve seat 254. Mixing without ratio control is obtained when the bimorph is deenergized as shown in FIG. 35. During such mode, with the illustrated configuration of valve seal members, valve seat dimensions, the diaphragm is position equidistantly between the valve seats so that the gap between the valve seal members and the valve seats is the same whereby the same quantity of fluid can pass from each of the inlet tubes 238 and 240 for mixing within the various regions of the fluid cavity 250 prior to discharge through the outlet tube 242.

Figure 37:
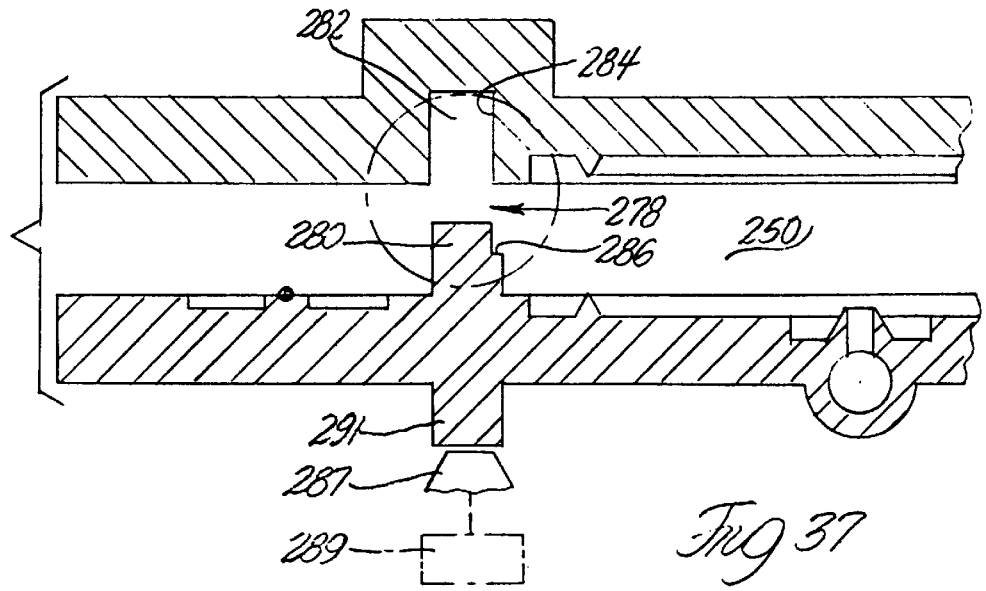
FIG. 37 is an enlarged fragmentary sectional view of region 37 in FIG. 35.

In the embodiment of the invention shown in FIG. 35, the fluid cavity 250 is sealed by a peripheral ultrasonic weld 276. In FIG. 37, a portion of the peripheral edge of the valve 230 is shown spaced apart prior to formation of the ultrasonic weld 276. The sonic seal 276 is produced at an ultrasonic shear joint 278 formed between a raised stepped rib 280 on the housing 242 that is received within a groove 282 having right angle walls thereon and a surface 284 that will interact with a step surface 286 on the rib 280 when a horn 287 of an ultrasonic welder 289 is applied to an outwardly directed extension 291 of the shear joint 278 with suitable energization of the horn to produce a resultant sonic seal 276.

Figure 38:
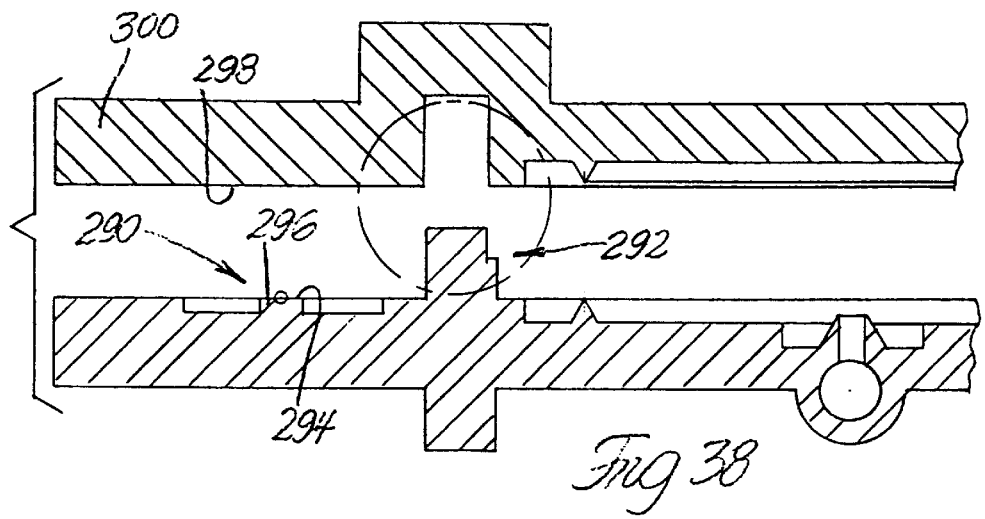
FIG. 38 is an enlarged fragmentary sectional view like FIG. 34 showing another embodiment of the invention.

If desired, the cavity can be sealed by used of a laser weld as set-forth in FIG. 35; in the embodiment of FIG. 38 the laser weld is shown at 290 at a point outboard of a shear joint 292 corresponding to the shear joint shown in the embodiment of FIG. 37. In this embodiment the laser weld 294 is formed at a raised annular surface 296 that is held against the underside 298 of a radially outwardly directed flange 300 on a housing member. It should be understood that the combination sealing arrangement may be used as a perimeter seal around a valve assembly cavity of any type including those shown in prior described applications. Furthermore, it should be understood that the sealed cavity may be provided in any fluid device that has an internal cavity that requires a hermetically sealed perimeter to assure against leakage from the internal cavity.

Figure 39:
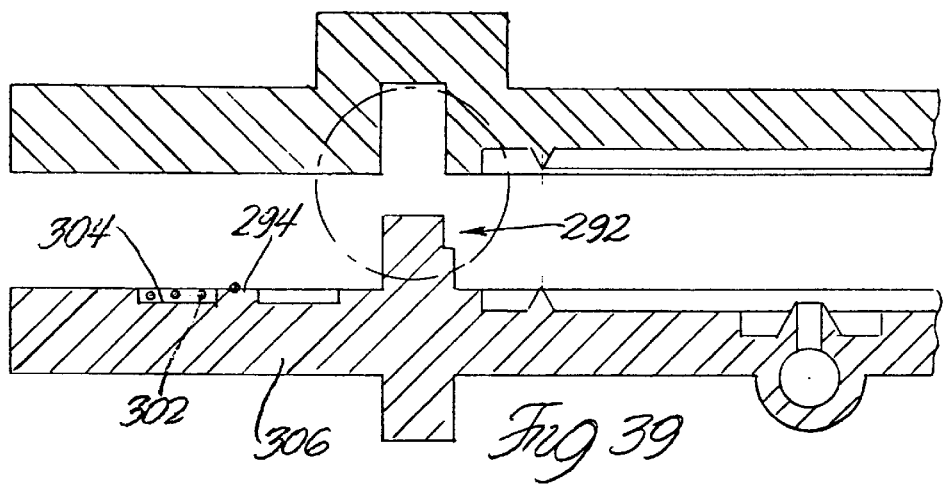
FIG. 39 is an enlarged fragmentary sectional view like FIG. 34 showing another embodiment of the invention.

Another feature of the hermetic attachment shown in FIG. 39 is that further assurance of sealing can be provided by a glue seal 302 filling an outer annular groove 304 formed in the outer flange 306 of a housing part corresponding to the housing member 236 in FIGS. 35 and 36 at a point laterally outwardly of the laser weld 294.

While the valve modules and processes of the present invention have proven industrial application in the field of pneumatically adjusted seating, mattresses and other forms of pneumatic support application, the valve modules are suitable for use in controlling fluid flow and pressure conditions in a wide variety of other fields such as the medical apparatus field and in various industrial control applications.

What is claimed is:

1. A pneumatic control valve assembly having a flow passage selectively opened and closed by a valve disc carried by a selectively energized piezoelectric actuator that has at least two operating positions characterized by:

a pair of oppositely facing housing members; one of said oppositely facing housing members having a cavity therein surrounded by a peripheral surface;

said peripheral surface connected to the other of said oppositely facing housing members for hermetically sealing said cavity;

a fluid flow port in at least one of said housing members;

said valve disc on each one of said plurality of circular diaphragms being positioned to close one of said plurality of fluid flow ports when each one of said circular diaphragms is in its first position and said valve disc on each one of said plurality of circular diaphragms being positioned to open said each one of said plurality of fluid flow ports when each one said circular diaphragms is in its second position.

2. In the valve assembly of claim 1, said each one of said circular diaphragms having a single layer of piezoelectric material thereon forming a monomorphic valve member.

3. In the valve assembly of claim 2, said additional plurality of cavities arranged in a staggered, offset pattern.

4. In the valve assembly of claim 2, said additional plurality of cavities arranged in axial alignment.

5. In the valve assembly of claim 2, said additional plurality of cavities stacked on each other.

6. In the valve assembly of claim 1, said each one of said circular diaphragms having a layer of piezoelectric material on each surface thereof forming a bimorphic valve member.

7. In the valve assembly of claim 6, said additional plurality of cavities arranged in a staggered, offset pattern.

8. In the valve assembly of claim 6, said additional plurality of cavities arranged in axial alignment.

9. In the valve assembly of claim 6, said additional plurality of cavities stacked on each other.

10. In the valve assembly of claim 1, said additional plurality of cavities arranged in a staggered, offset pattern.

11. In the valve assembly of claim 10, said housing members each including a raised peripheral rib thereon; and a laser weld joining said ribs for providing a seal therebetween that will hermetically seal said cavity.

12. In the valve assembly of claim 1, said additional plurality of cavities arranged in axial alignment.

13. In the valve assembly of claim 12, said housing members each including a raised peripheral rib thereon; and a laser weld joining said ribs for providing a seal therebetween that will hermetically seal said cavity.

14. In the valve assembly of claim 1, said additional plurality of cavities stacked on each other.

15. In the valve assembly of claim 14, said housing members each including a raised peripheral rib thereon; and a laser weld joining said ribs for providing a seal therebetween that will hermetically seal said cavity.

16. In the valve assembly of claim 1, said other of said housing members being a cover forming an enclosure for said fluid flow ports; said cover having an outer surface thereon; a circuit board supported on said outer surface; and wherein said circuit board has conductive seal elements thereon that connect to said piezoelectric material on each of said plurality of circular diaphragms to provide an electrical connection thereacross while sealing against fluid leakage from each of said plurality of cavities.

17. In the valve assembly of claim 1, one of said housing members being a cover forming an enclosure for said plurality of fluid flow ports; said cover having an outer surface thereon; a circuit board supported on said outer surface; and wherein a pair of flexible conduits each having a plurality of conductors therein are connected at one end to said circuit board; an opening in said cover for passing said pair of flexible conduits there through; one of said pair of flexible ribbon conduits located on one side of said circular disc and the other of said pair of flexible ribbon conduits located on the other side of said circular disc; traces of conductive material on the piezoelectric material on each of said plurality of circular discs electrically connected to each of said flexible conduits to provide an electrical connection there across; a seal between said flexible conduits and said cover for sealing against leakage from said cavity.

18. In the valve assembly of claim 1, said housing members each including a raised peripheral rib thereon; and a laser weld joining said ribs for providing a seal therebetween that will hermetically seal said cavity.

19. A pneumatic control valve assembly having a flow passage selectively opened and closed by a valve disc carried by a selectively energized piezoelectric actuator that has at least two operating positions characterized by:

a pair of oppositely facing housing members; one of said oppositely facing housing members having a cavity therein surrounded by a peripheral surface;

said peripheral surface connected to the other of said oppositely facing housing members for hermetically sealing said cavity;

a fluid flow port in at least one of said housing members;

said piezoelectric actuator including a circular diaphragm supported in said cavity; said valve disc supported on said circular diaphragm in alignment with said fluid flow port;

piezoelectric material on said circular diaphragm and a pair of contacts for directing voltage across said piezoelectric material for causing a change of state therein to deflect said circular diaphragm between first and second positions;

said valve disc being positioned to close said fluid flow port when said circular diaphragm is in its first position and said seal member being positioned to open said fluid flow port when said circular diaphragm is in its second position; one of said housing members being a cover forming an enclosure for said fluid flow port; said cover having an outer surface thereon; a circuit board supported on said outer surface; and wherein said circuit board has conductive seal elements thereon that connect to said piezoelectric material to provide an electrical connection thereacross while sealing against fluid leakage from said cavity.

20. A pneumatic control valve assembly having a flow passage selectively opened and closed by a valve disc carried by a selectively energized piezoelectric actuator that has at least two operating positions characterized by:

a pair of oppositely facing housing members; one of said oppositely facing housing members having a cavity therein surrounded by a peripheral surface;

said peripheral surface connected to the other of said oppositely facing housing members for hermetically sealing said cavity;

a fluid flow port in at least one of said housing members;

said piezoelectric actuator including a circular diaphragm supported in said cavity; said valve disc supported on said circular diaphragm in alignment with said fluid flow port;

piezoelectric material on said circular diaphragm and a pair of contacts for directing voltage across said piezoelectric material for causing a change of state therein to deflect said circular diaphragm between first and second positions;

said valve disc being positioned to close said fluid flow port when said circular diaphragm is in its first position and said seal member being positioned to open said fluid flow port when said circular diaphragm is in its second position; one of said housing members being a cover forming an enclosure for said fluid flow port; said cover having an outer surface thereon; a circuit board supported on said outer surface; and wherein a pair of flat flexible ribbon conduits each having a plurality of transversely spaced electrically insulated conductors therein are connected at one end to said circuit board; an opening in said cover for passing said pair of flat flexible ribbon conduits between said cover and the other of said housing members; one of said pair of flat flexible ribbon conduits located on one side of said circular disc and the other of said pair of flat flexible ribbon conduits located on the other side of said circular disc; traces of electrically conductive material on the piezoelectric material on said circular disc electrically connected to said plurality of transversely spaced electrically insulated conductors to provide an electrical connection there across; a seal between said pair of flat flexible ribbon conduits and said cover for sealing against leakage from said cavity.

21. In the valve assembly of claim 20, said piezoelectric material on said circular diaphragm forming a monomorphic valve and a flexible conduit located on opposite faces of said monomorphic valve.

22. In the valve assembly of claim 20, said piezoelectric material on each of said plurality of circular diaphragms forming a bimorphic valve and one of said flexible conduits being located on opposite faces of said bimorphic valve.

23. A fluid control valve assembly having a flow passage selectively opened and closed by a valve actuator characterized by:

a pair of oppositely facing housing members; one of said oppositely facing housing members having a cavity therein surrounded by a peripheral surface;

said peripheral surface connected to the other of said oppositely facing housing members for hermetically sealing said cavity;

a fluid flow port in at least one of said housing members;

at least one rib on one of said oppositely facing housing members integrally welded to the other of said oppositely facing housing members for hermetically sealing said cavity; said at least one rib joined by a laser weld to said other of said housing member for providing a seal therebetween that will hermetically seal said cavity; and an air gap on either side of said at least one rib to enhance contact between said first and second housing members during connection by said laser weld.

24. In the valve assembly of claim 23 further characterized by an air gap on either side of said at least one rib to enhance contact between said first and second housing members during connection by said laser weld and said air gap formed as an annulus around said rib and a filler of sealant material within said annulus.

25. In the valve assembly of claim 24 said sealant material being glue.

26. In the valve assembly of claim 24 said sealant material being an O-ring.

* * * * *